(12) United States Patent
Kraft et al.

(10) Patent No.: US 12,523,448 B1
(45) Date of Patent: *Jan. 13, 2026

(54) INFRARED FIREARM SIGHT CAMERA ATTACHMENT, SYSTEM AND METHOD

(71) Applicant: GunEye, LLC, Palm Bay, FL (US)

(72) Inventors: Steve Kraft, Rockledge, FL (US); Celeste Zotto, Palm Bay, FL (US); Eric Dupont Becnel, Madison, AL (US)

(73) Assignee: GUNEYE, LLC, Palm Bay, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,286

(22) Filed: Feb. 13, 2024

Related U.S. Application Data

(60) Division of application No. 17/881,899, filed on Aug. 5, 2022, now Pat. No. 11,927,428, which is a
(Continued)

(51) Int. Cl.
  *H04N 5/63* (2006.01)
  *F41G 3/14* (2006.01)
  (Continued)

(52) U.S. Cl.
  CPC ............. *F41G 3/165* (2013.01); *F41G 3/145* (2013.01); *F41G 11/001* (2013.01); *H04N 5/63* (2013.01);
  (Continued)

(58) Field of Classification Search
  CPC .................................. F41G 3/145; F41G 3/165
  (Continued)

(56) References Cited

U.S. PATENT DOCUMENTS

| 4,713,889 A | * | 12/1987 | Santiago | ................. F41G 1/345 |
| | | | | 224/246 |
| 5,376,921 A | | 12/1994 | Trikilis | |

(Continued)

OTHER PUBLICATIONS

Weaponeye, A Witness When You Need It the Most, HD Camera—Laser Sight—Flashlight, retrieved from https://weaponeye.com, retrieved on Nov. 22, 2016, 25 pages.
(Continued)

*Primary Examiner* — Bret Hayes
(74) *Attorney, Agent, or Firm* — Brian S. Steinberger; Hilary F. Steinberger; Steinberger IP Law

(57) ABSTRACT

Devices, systems and methods for providing firearms, including handguns, with infrared sights and a camera which can be held in one shooter's hand. The camera can send live video which can display a target to a portable display, such as a smart phone, smart watch or smart glasses, that is held in another hand of the shooter, so that the shooter remains out of harms' way if the target is armed. The novel sight can include hybrids of combinations of infrared and bright white visible lights, and use all visible bright white light. A motion sensor or magnetometer sensor can be separately used to cause the novel sight to become activated. Wireless charging can be accomplished with charging circuits, charging pads and USB cables and ports. A multi-position locking system can allow for a rail key to be used for spacing the novel sight at up to twelve different positions relative to the firearm.

12 Claims, 31 Drawing Sheets

Related U.S. Application Data continuation-in-part of application No. 17/085,037, filed on Oct. 30, 2020, now Pat. No. 11,408,711, which is a continuation of application No. 16/441,565, filed on Jun. 14, 2019, now abandoned, which is a continuation of application No. 15/802,157, filed on Nov. 2, 2017, now Pat. No. 10,323,904.

(60) Provisional application No. 62/416,182, filed on Nov. 2, 2016.

(51) Int. Cl.
    *F41G 3/16*     (2006.01)
    *F41G 11/00*     (2006.01)
    *H04N 23/56*     (2023.01)
    *H04N 23/57*     (2023.01)
    *H04N 23/63*     (2023.01)

(52) U.S. Cl.
CPC .............. *H04N 23/56* (2023.01); *H04N 23/57* (2023.01); *H04N 23/63* (2023.01)

(58) Field of Classification Search
USPC .......................... 42/114, 115, 146; 89/41.05
See application file for complete search history.

(56) References Cited

U.S. PATENT DOCUMENTS

| | | | |
|---|---|---|---|
| 5,584,137 | A | 12/1996 | Teetzel |
| 5,711,104 | A | 1/1998 | Schmitz |
| 5,834,676 | A | 11/1998 | Elliott |
| 6,784,796 | B2 | 8/2004 | Johnston et al. |
| 7,255,035 | B2 | 8/2007 | Mowers |
| D612,756 | S | 3/2010 | DAmelio et al. |
| 7,897,277 | B2 | 3/2011 | Meyer et al. |
| 8,234,968 | B2 | 8/2012 | Hodge |
| 8,256,153 | B1 | 9/2012 | Noha et al. |
| D729,339 | S | 5/2015 | Chavez et al. |
| D737,399 | S | 8/2015 | Cheng et al. |
| D738,455 | S | 9/2015 | Homem de Mello Anderson et al. |
| D742,991 | S | 11/2015 | Klecker et al. |
| D749,184 | S | 2/2016 | Sakiewicz et al. |
| D749,689 | S | 2/2016 | Cheng et al. |
| D755,340 | S | 5/2016 | Essig |
| 9,335,109 | B2 | 5/2016 | Bensayan et al. |
| D763,399 | S | 8/2016 | Anderson |
| 9,591,255 | B2 | 3/2017 | Sakiewicz et al. |
| D796,622 | S | 9/2017 | Sharrah |
| D800,864 | S | 10/2017 | Hartley |
| 9,810,411 | B2 | 11/2017 | Galli et al. |
| 10,323,904 | B1 | 6/2019 | Batten |
| D865,107 | S | 10/2019 | Batten |
| 11,408,711 | B1 | 8/2022 | Batten |
| 2003/0169183 | A1 | 9/2003 | Korepanov et al. |
| 2007/0024587 | A1 | 2/2007 | Shiau |
| 2007/0039226 | A1 | 2/2007 | Stokes |
| 2007/0180752 | A1 | 8/2007 | Houde-Walter |
| 2007/0181114 | A1 | 8/2007 | Tippmann |
| 2008/0034954 | A1 | 2/2008 | Grober |
| 2008/0092421 | A1 | 4/2008 | Beckmann |
| 2009/0122527 | A1 | 5/2009 | Galli |
| 2010/0176741 | A1 | 7/2010 | Sharrah et al. |
| 2010/0258000 | A1 | 10/2010 | Hagerty |
| 2011/0035984 | A1 | 2/2011 | Liu |
| 2011/0252681 | A1* | 10/2011 | Houde-Walter .......... F41G 1/35 42/1.01 |
| 2013/0333266 | A1 | 12/2013 | Gose et al. |
| 2014/0230306 | A1 | 8/2014 | Arachequesne |
| 2014/0360078 | A1 | 12/2014 | Arachequesne |
| 2015/0062877 | A1 | 3/2015 | Takes |
| 2015/0184978 | A1 | 7/2015 | Hedeen |
| 2015/0226521 | A1* | 8/2015 | Patterson ................ F41G 1/345 29/622 |
| 2015/0276352 | A1 | 10/2015 | Chang et al. |
| 2015/0362276 | A1 | 12/2015 | Fischer |
| 2015/0369554 | A1 | 12/2015 | Kramer |
| 2016/0047626 | A1 | 2/2016 | Kremer et al. |
| 2016/0209167 | A1 | 7/2016 | Wells |
| 2017/0054315 | A1 | 2/2017 | Chien |
| 2017/0059265 | A1 | 3/2017 | Winter et al. |
| 2017/0138701 | A1 | 5/2017 | Kowalczyk, Jr. et al. |
| 2018/0023910 | A1 | 1/2018 | Kramer |
| 2018/0087876 | A1 | 3/2018 | Galli et al. |
| 2018/0094900 | A1 | 4/2018 | Sharrah et al. |
| 2018/0302559 | A1 | 10/2018 | Lee |
| 2019/0301833 | A1 | 10/2019 | Campbell |

OTHER PUBLICATIONS

GunCam Shooting Sports, Sports Shooting Packages, retrieved from http://www.tachyoninc.com/sportshooting.html, retrieved on Nov. 22, 2016, 21 pages.
Thomas Investigative Publications, Inc., Wireless GunCam With Laser Sight, Apr. 13, 2008, retrieved from https://web.archive.org/web/20080413032021/http://www.pimall.com/mais/guncam.html, retrieved on Jun. 2, 2018, 4 pages.
Batten, W., Utility U.S. Appl. No. 15/802,157, filed Nov. 2, 2017, Office Action Summary mailed on Jun. 4, 2018, 12 pages.
Laserspeed LS-CL3-IR Infrared Laser and Weaponlight Gun Mounted LED Flashlight for Glock, retrieved from https://www.exportimes.com/products/LASERSPEED-LS-CL3-IR-Infrared-Laser_10567.html#, retrieved on Jul. 18, 2018, 1 page.
Laser Sights—Security Management and Law Enforcement—Grainger Industrial Supply, Rifle Laser Sight, Barska and Steiner, retrieved from https://www.grainger.com/categiry/laser-sights/security-management-and-law-enforcement/security/ecatalog/N-nqu?cm_sp=Product_Details-_-Category.com, retrieved on Jul. 18, 2018, 3 pages.
Batten, W., U.S. Appl. No. 29/624,273, filed Oct. 31, 2017, Office Action Summary mailed Jul. 23, 2018, 6 pages.

* cited by examiner

FIG. 1A
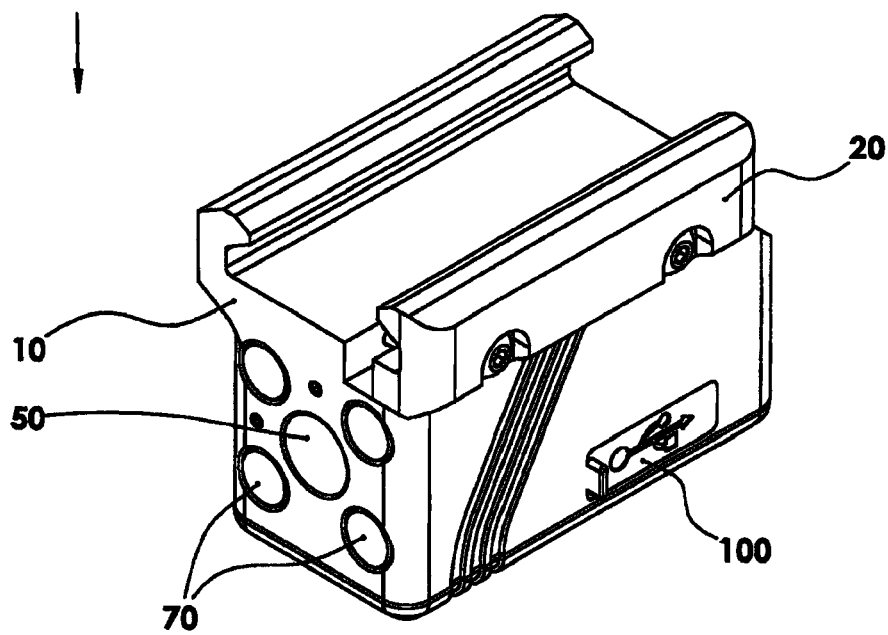
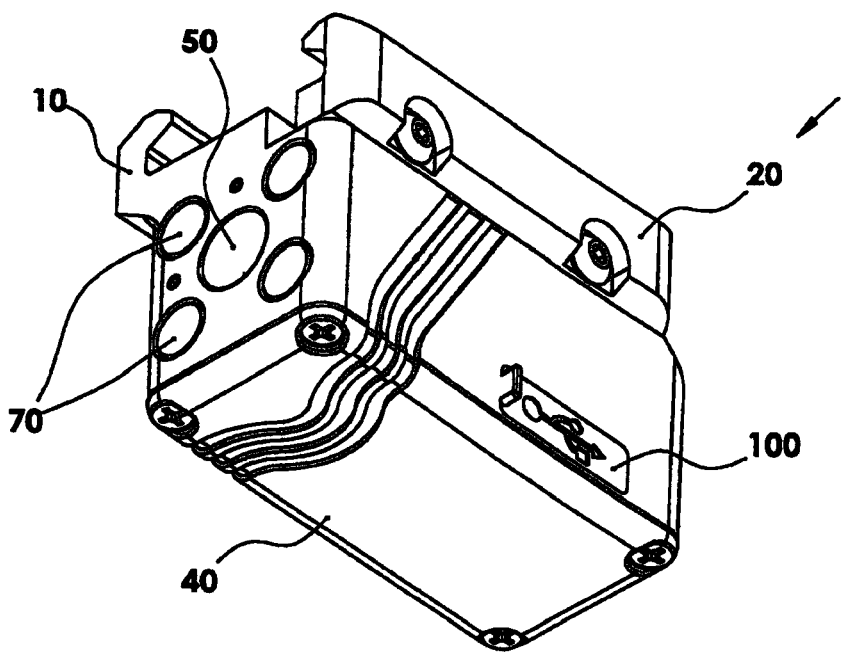
FIG. 1B

SECTION 3B-3B

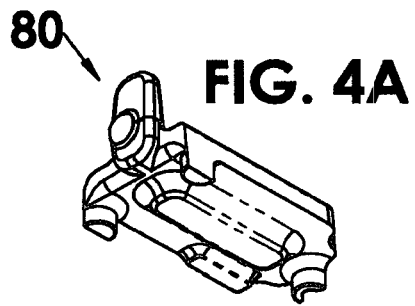
FIG. 4A
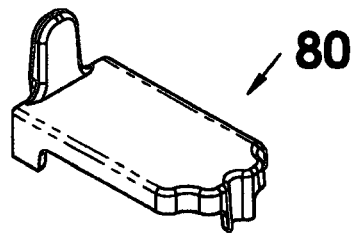
FIG. 4B
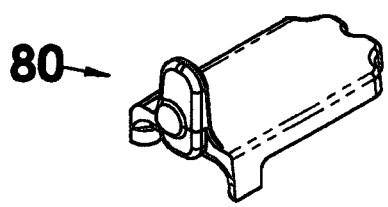
FIG. 4C
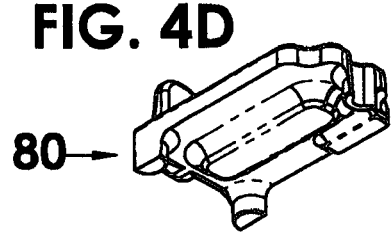
FIG. 4D
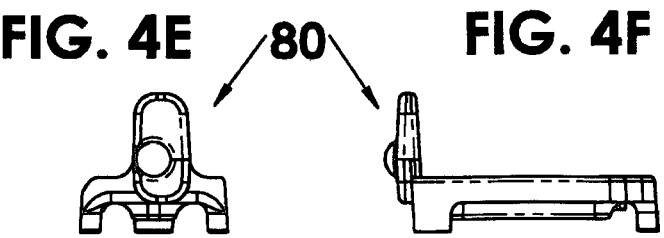
FIG. 4E  FIG. 4F
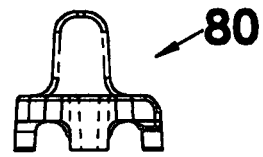
FIG. 4G
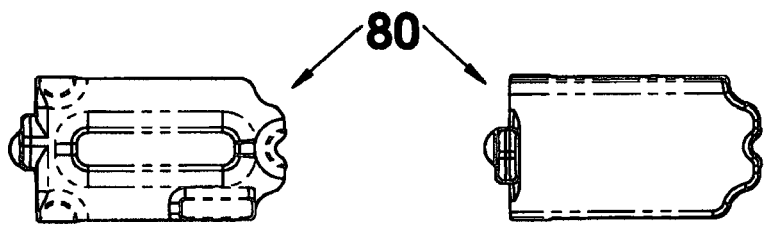
FIG. 4H  FIG. 4I

FIG. 8A
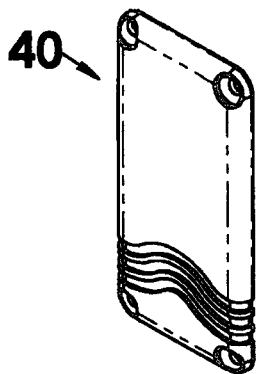
FIG. 8B
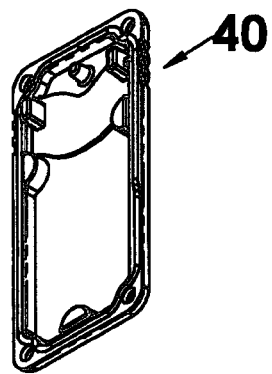
FIG. 8D
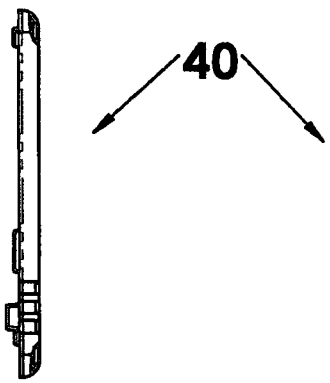
FIG. 8C
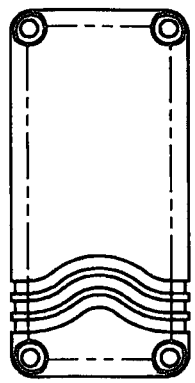
FIG. 8E
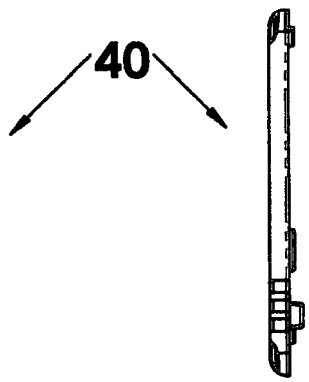
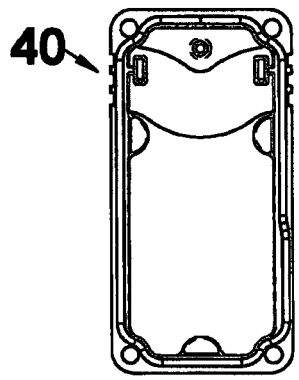
FIG. 8F
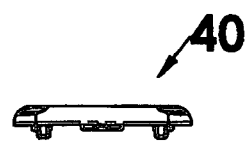
FIG. 8G

FAE MAIN ASSY (View from Top Side)

110

FAE MAIN ASSY (View from Top Side)

FIG. 10A

| Designator | Qty | MFG | MPN |
|---|---|---|---|
| C1,C2,C3,C4,C5,C6,C7,C8,C13,C14,C15,C17,C18,C22,C32,C33,C34,C35,C36,C39,C40,C42,C43,C44,C45,C46,C47,C48,C49 | 29 | MURATA | GRM155R61A104KA01D |
| C9,C20 | 2 | TDK CORPORATION | CGB2A1X5R1E105K033BC |
| C10,C11 | 2 | KEMET | C0402C689C5GACTU |
| C12,C24,C25,C26,C28,C29,C30,C31 | 8 | SAMSUNG | CL05A106MP5NUNC |
| C16,C19,C23,C37,C38,C50 | 6 | TAIYO YUDEN | LMK105BJ225MV-F |
| C21,C27,C41 | 3 | TDK CORPORATION | C1005X5R1A475M050BC |
| D1,D2 | 2 | LITTLEFUSE | V5.5MLA0402NR |
| FB1 | 1 | LAIRD-SIGNAL INTEGRITY PRODUCTS | H10603P600R-10 |
| J1 | 1 | MOLEX | 0512812494 |
| J5 | 1 | AMPHENOL FCI | 10118192-0001LF |
| L1,L2,L3 | 3 | TDK CORPORATION | MLZ1608A2R2M |
| LED1 | 1 | SUNLED | XZMDKDGCBD56W |
| R1,R2,R10,R11 | 4 | PANASONIC | ERJ-2RKF4701X |
| R3,R18 | 2 | YAGEO | RC0402FR-0775KL |
| R4 | 1 | PANASONIC | ERJ-2RKF1004X |
| R5,R8,R9,R17 | 4 | VISHAY/DALE | CRCW040210K0FKED |
| R6,R7,R19 | 3 | PANASONIC | ERJ-2GE0R00X |
| R12,R13,R14 | 3 | Panasonic | ERJ-2RKF1001X |
| R15 | 1 | PANASONIC | ERJ-2GE0R00X |
| R16 | 1 | Panasonic | ERJ-38WFR050V |
| R20 | 1 | KOA | RK73H1ETP1000F |
| R21 | 1 | PANASONIC | ERJ-2RKF3011X |
| R22,R23 | 2 | YAGEO | RC0402FR-0728RL |

FIG. 10B

| RT1 | | 1 | Panasonic Electronic Components | ERT-J0EM103J |
|---|---|---|---|---|
| SW1 | | 1 | E-SWITCH | TL1014BF160QG |
| TP15 | | 1 | KEYSTONE | 5017 |
| U1 | | 1 | SONIX | SN9C292BIG |
| U2 | | 1 | Espressif | ESP-WROOM-32 |
| U3 | | 1 | Macronix | MX25L1006EZUI-10G |
| U4 | | 1 | STMicroelectronics | STM32F723ZEI6 |
| U5 | | 1 | KINGSTON | EMMC04G-S627-X02U |
| U6 | | 1 | LINEAR | LTC2941#TRMPBF |
| U7 | | 1 | Texas Instruments | TPS65217ARSLT |
| X1 | | 1 | ABRACON | ABM10-166-12.000MHZ-T3 |
| X2 | | 1 | Abracon | ASCO-25.000MHZ-EK-T3 |

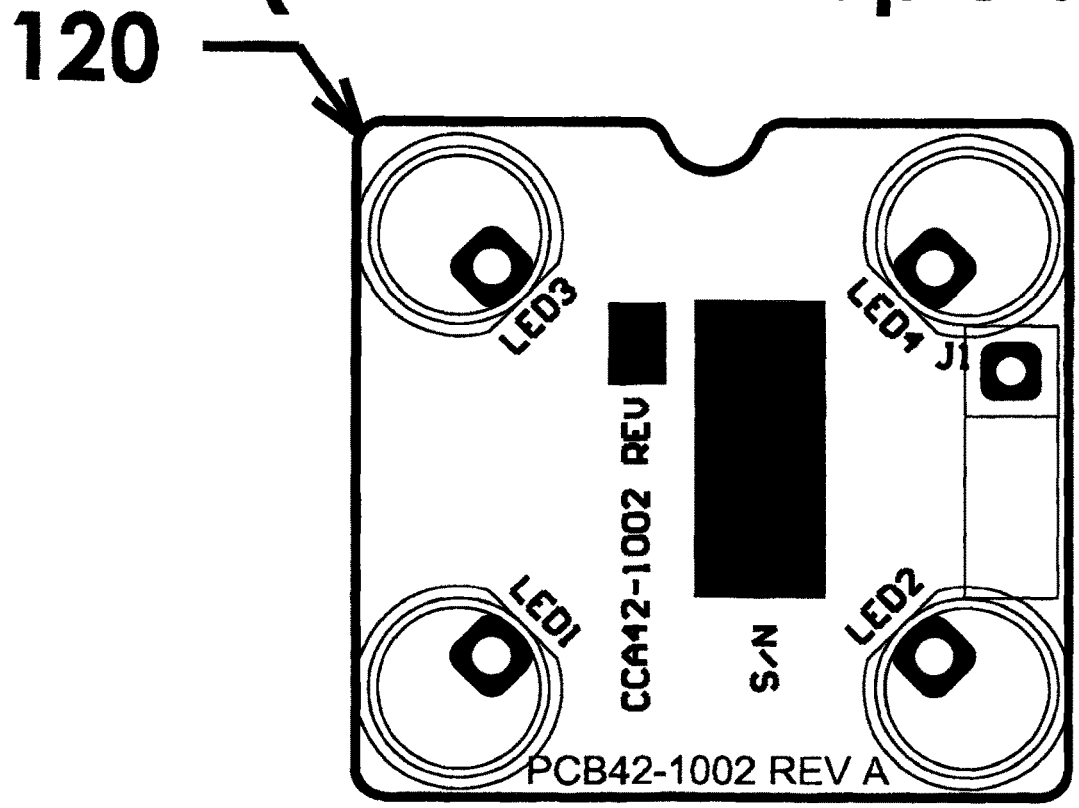

FAE LED ASSY (View from Top Side)

FIG. 12 - FAE LED REV A

| Designator | Qty | Description | MFG | MPN |
|---|---|---|---|---|
| C1 | 1 | CAPACITOR CER 0.10UF 10V X5R 0402 | MURATA | GRM155R61A104KA01D |
| C2,C4 | 2 | CAP CER 10UF 10V X5R 0402 | SAMSUNG | CL05A106MP5NUNC |
| C3 | 1 | CAPACITOR CER 1UF 25V X5R 0402 | TDK CORPORATION | CGB2A1X5R1E105K0338C |
| D1 | 1 | DIODE SCHOTTKY 30V 100MA SOD323 | Micro Commercial | SD107WS-TP |
| D2 | 1 | DIODE SCHOTTKY 40V 500MA 1206 | AVX | SD1206S040S0R5 |
| L1 | 1 | IND FIXED 4.7UH 820MA 500 MOHM | SAMSUNG | C1G10W4R7MNC |
| LED1, LED2, LED3, LED4 | 4 | LED EMITTER IR 950NM 100MA RADIAL | OSRAM Opto Semiconductors Inc. | SFH 4545 |
| R1 | 1 | RESISTOR 0 OHM 1/10W 0402 | PANASONIC | ERJ-2GE0R00X |
| R2 | 1 | RESISTOR 100K OHM 1% 1/16W 0402 | VISHAY/DALE | CRCW0402100KFKED |
| R3 | 1 | RES 0.51 OHM 1/16W 1% 0402 SMD | YAGEO | RL0402FR-070R51L |
| U1 | 1 | IC LED DRIVER RGLTR DIM TSOT23-6 | Texas Instruments | LM3405AXMK/NOPB |

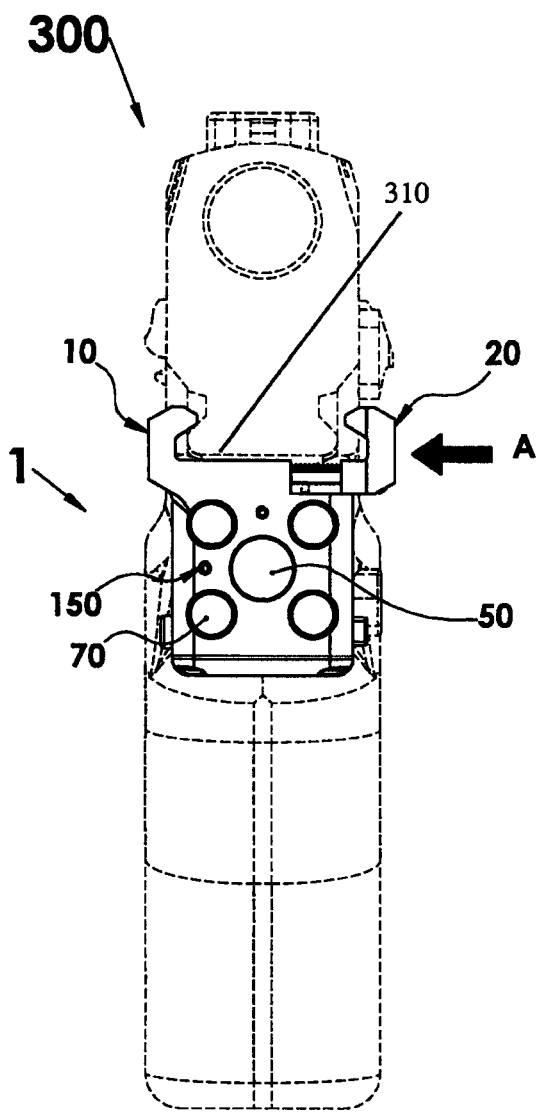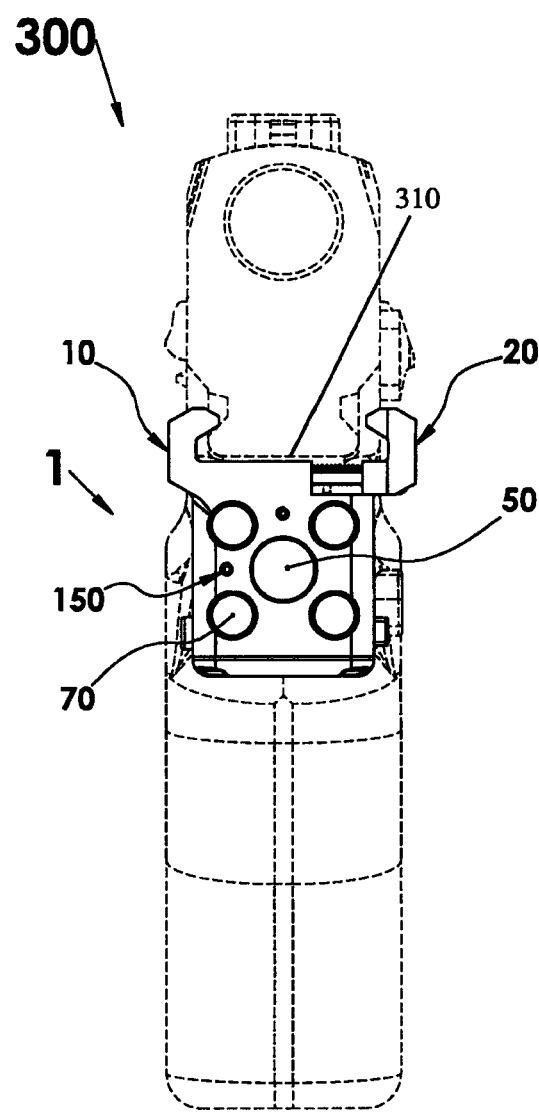
(Prior to clamping)
FIG. 13A
(Clamped)
FIG. 13B

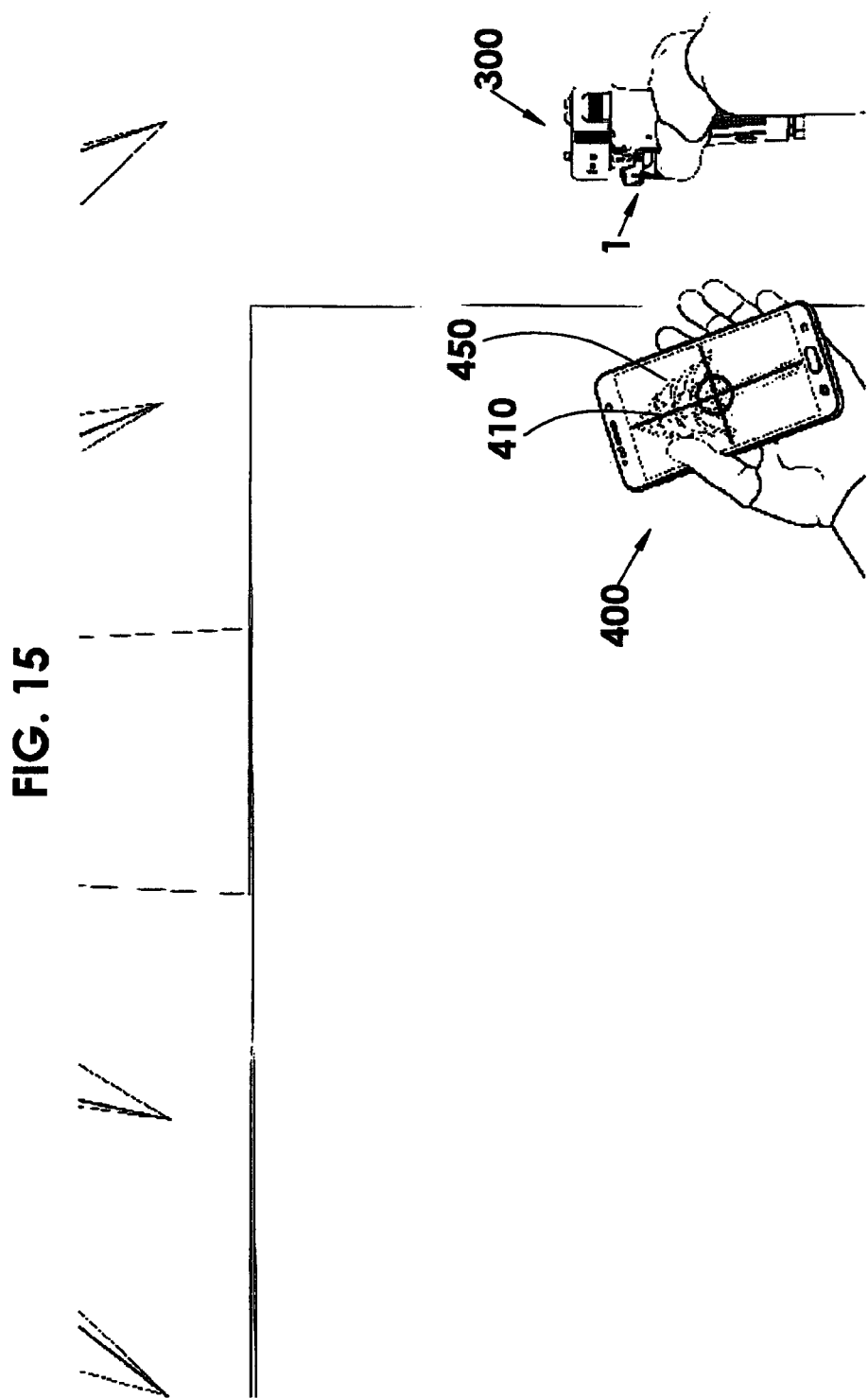

GUNEYE Application Installation

GUNEYE Flow Diagram

INFRARED FIREARM SIGHT CAMERA ATTACHMENT, SYSTEM AND METHOD

CROSS REFERENCE TO RELATED APPLICATIONS

This application is Divisional Patent application of U.S. patent application Ser. No. 17/881,899 filed Aug. 5, 2022, now U.S. Pat. No. 11,927,428, which is a Continuation-In-Part of U.S. patent application Ser. No. 17/085,037 filed Oct. 30, 2021, now allowed, now U.S. Pat. No. 11,408,711, which is a Continuation Patent Application of U.S. patent application Ser. No. 16/441,565 filed Jun. 14, 2019, now abandoned, which is a Continuation Patent Application of U.S. patent application Ser. No. 15/802,157 filed Nov. 2, 2017, now U.S. Pat. No. 10,323,904, which claims the benefit of priority to U.S. Provisional Application Ser. No. 62/416,182 filed Nov. 2, 2016. The entire disclosure each of the applications listed in this paragraph are incorporated herein by specific reference thereto.

FIELD OF INVENTION

This invention relates to firearm sights, and in particular to devices, systems and methods for providing firearms, including handguns, with infrared sights and a camera which can wirelessly display a target to a portable display, such as a smart phone, smart watch or smart glasses, so that the body of the shooter remains out of harms' way.

BACKGROUND AND PRIOR ART

Firearm sights allow for light sources such as a light emitting diode to be attached to a firearm, which places a dot on a target. However, there are problems with these devices, since they generally require the shooter be out in the open.

This problem is compounded when the shooter's target is also armed with a firearm. While the shooter is aiming at the armed target, the shooter becomes exposed to the armed target, which can be extremely dangerous since the armed target can fire back putting the shooter in harm's way.

Thus, the need exists for solutions to the above problems with the prior art.

SUMMARY OF THE INVENTION

A primary objective of the present invention is to provide devices, systems and methods for providing firearms, including handguns, with infrared sights and a camera which can display a target to a portable display, such as a smart phone, smart watch or smart glasses, so that the shooter remains out of harms' way.

A secondary objective of the present invention is to provide devices, systems and methods for providing firearms with infrared sights and a camera, so that a shooter can safely fire their weapon around corners or behind safe obstructions by only exposing their hand to an armed target.

A third objective of the present invention is to provide devices, systems and methods for providing firearms with LED sights and a camera, where the LED sights can include combination of lights that can be infrared lights, hybrids of infrared and bright white visible lights, and bright white visible lights.

A fourth objective of the present invention is to provide devices, systems and methods for providing firearms with LED sights and a camera, with a motion sensor which can activate the LED sights and the camera when the firearm is moved in selected motions that can include side to side, forward motion, and motions replicating pulling the firearm in a clockwise direction from a holster position.

The novel IR LED camera targeting system can attach to weapons using common rail systems.

The novel attachment housing can have internal and/or a removable battery. The IR (infrared) lights can be used for both low light and night vision applications.

The IR LED camera targeting system can provide a secure WIFI connection to a user's portable digital display device that can include a smart phone, smart watch or VR (virtual reality) glasses.

A mobile software app can provide for live streamed video feeds with a sight overlay that can allow for sight adjustments via a smart App where no adjustments are needed on the weapon for calibrating sights for a more accurate shot.

The novel system allows for firing of a firearm, such as a handgun from behind cover and around corners by only exposing the user's hand when used in conjunction with the secondary sight camera from the smart device, such as the smart phone, smart watch or VR glasses.

A target sighting system for firearms, can include a target sighting attachment for a firearm having a front facing camera and at least one front facing light source, and a wireless transmission medium for sending a live target image from the camera to another location, and a power supply for supplying power to the target sighting attachment, an attachment mechanism for attaching the target sighting attachment to a firearm, a portable power supply for providing power to the target sighting attachment, and a portable digital display device adjacent to the firearm with the target sighting attachment for displaying the target image on a display, wherein the firearm with the target sighting attachment is adapted to be held by one hand of a user while another hand of the user is adapted to support the portable digital display device.

The at least one front facing light source can include an LED (light emitting diode), with four LEDs arranged in a rectangular pattern.

The portable digital display device can include a smart phone, a smart watch, and VR (virtual reality) glasses.

The live target image can include live video streaming of the target sent by the wireless transmission to the portable digital display device.

The attachment mechanism can include clamps for clamping about rails on the firearm. The firearm can be a handgun with rail system.

The portable digital display device can include an overlay image on the display of the portable digital display device which allows for sight adjustments of the target without mechanical attachments needed on the target sighting attachment.

The target sighting attachment can include a camera adjustment adapter for adjusting position of the camera for aiming at the target.

A method of aiming a firearm at an armed target by only exposing one hand of the shooter holding the firearm to the armed target, can include the steps of providing a target sighting attachment for a firearm having a front facing camera and at least one front facing light source, attaching the target sighting attachment to a firearm, providing a portable digital display device for displaying the target image on a display, aiming the firearm with the target sighting attachment with one hand of a shooter at an armed target, supporting the portable digital display device in another hand without exposing the shooter to the armed target, and sending an image of the armed target via a wireless transmission medium from the camera to the portable digital display device. The image can be a live video stream.

The method can include the step of providing an overlay image on the display of the portable digital display device which allows for sight adjustments of the target without mechanical attachments needed on the target sighting attachment.

The method can include the step of providing a camera adjustment adapter for adjusting position of the camera for aiming at the target.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 1A is an upper front right perspective view of the infrared LED sight camera attachment for a firearm.

FIG. 1B is a lower front right perspective view of the infrared LED sight camera attachment of FIG. 1A.

FIG. 4A is a lower front right perspective view of the wedge for the infrared LED sight camera attachment of FIG. 1A.

FIG. 4B is an upper rear left perspective view of the wedge of FIG. 4A.

FIG. 4C is an upper front right perspective view of the wedge of FIG. 4A.

FIG. 4D is a lower rear right perspective view of the wedge of FIG. 4A.

FIG. 4E is a front view of the wedge of FIG. 4A.
FIG. 4F is a right side view of the wedge of FIG. 4A.
FIG. 4G is a rear view of the wedge of FIG. 4A.
FIG. 4H is a bottom view of the wedge of FIG. 4A.
FIG. 4I is a top view of the wedge of FIG. 4A.

FIG. 8A is a front right perspective view of the cover for the infrared LED sight camera attachment of FIG. 1A.
FIG. 8B is a rear left perspective view of the cover of FIG. 8A.
FIG. 8C is a front view of the cover of FIG. 8A.
FIG. 8D is a left side view of the cover of FIG. 8A.
FIG. 8E is a right side view of the cover of FIG. 8A.
FIG. 8F is a rear view of the cover of FIG. 8A.
FIG. 8G is a top view of the cover of FIG. 8A.

FIG. 10A is a first table of the electrical components used in the main circuit card assembly of FIGS. 9A-9B.

FIG. 10B is a second table of the electrical components used in the main circuit card assembly of FIGS. 9A-9B.

FIG. 11A is an enlarged front view of the IR LED circuit card assembly for the infrared LED sight camera attachment of FIG. 1A.

FIG. 12 is a table of the electrical components used in the IR LED circuit card assembly of FIGS. 11A-11B.

FIG. 13A is a front view of the infrared LED sight camera attachment of FIG. 1A slid over rails under a barrel of a handgun firearm prior to clamping to the rails.

FIG. 13B is another view of the infrared LED sight camera attachment of FIG. 13A clamped to the rails on the firearm.

FIG. 15 shows the firearm with clamped infrared LED sight camera attachment of FIGS. 13A-14B with smart phone displaying a target while the shooter is out of the target's view.

CIP FIGURES

Figure 19A:
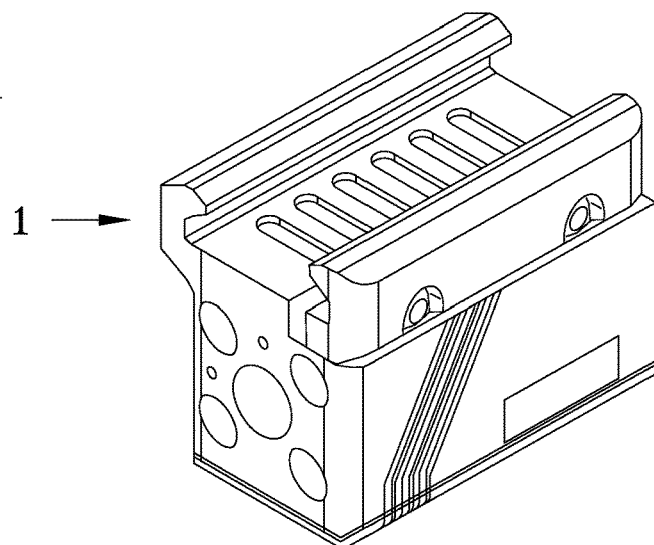

FIG. 19A is an upper front right perspective view of the infrared LED sight camera attachment for a firearm of the previous embodiment.

Figure 19B:
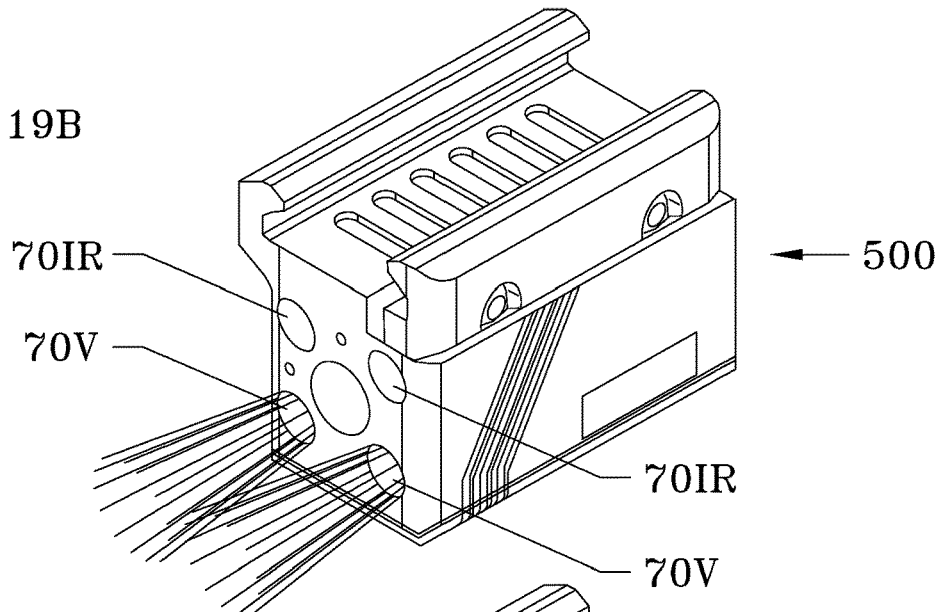

FIG. 19B is an upper front right perspective view of a hybrid embodiment of FIG. 19A using two infrared LEDs and two visible light LEDs.

Figure 19C:
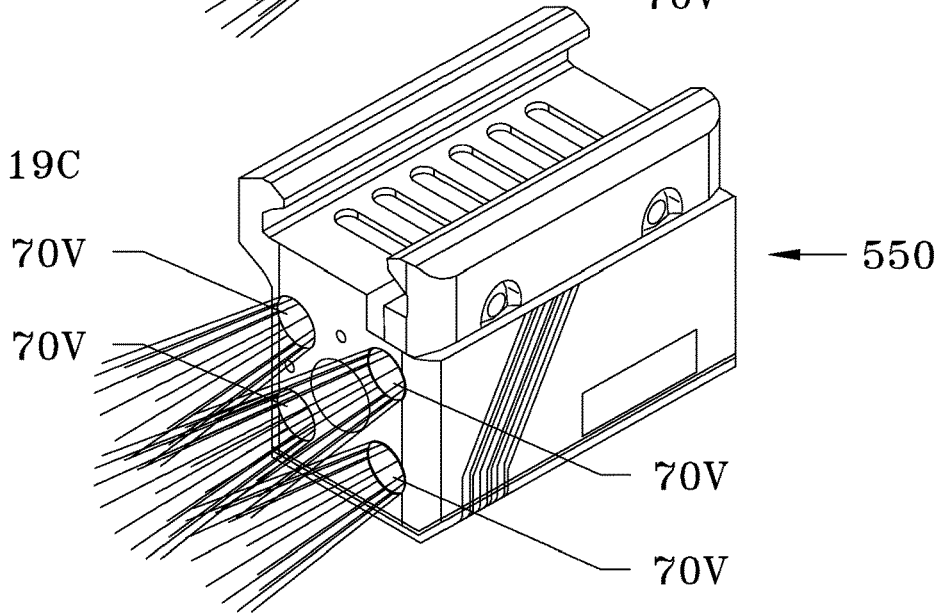

FIG. 19C is another upper front right perspective view of another hybrid embodiment of FIG. 19A using all four visible white LEDs.

Figure 20A:
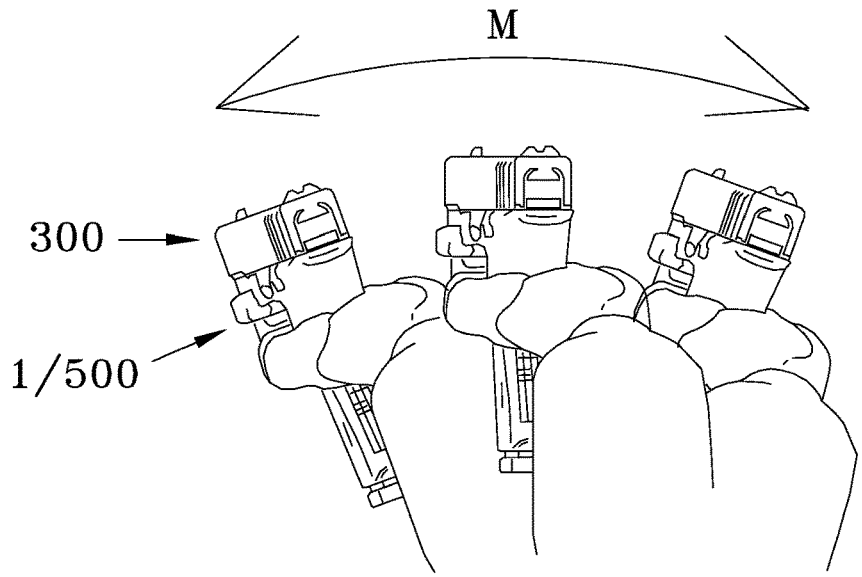

FIG. 20A is a rear perspective view of a firearm with clamped LED sight camera attachment held by a user moved side to side to activate the LED sight camera attachment from sleep mode to working mode.

Figure 20B:
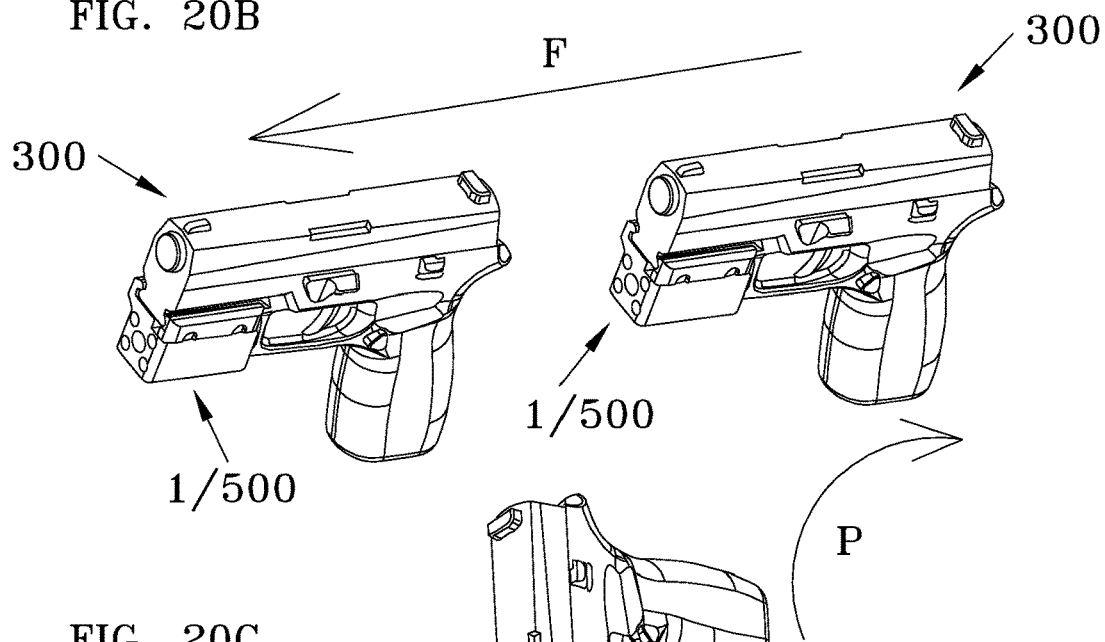

FIG. 20B is a right side perspective view of the firearm with clamped LED sight camera attachment of FIG. 20A being moved forward to activate the LED sight camera attachment from sleep mode to working mode.

Figure 20C:
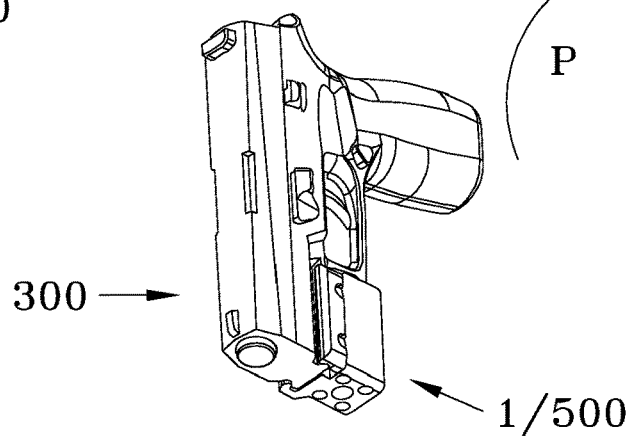

FIG. 20C is a top right side perspective view of the firearm with clamped LED sight camera attachment of FIG. 20A being lifted in a clockwise direction to activate the LED sight camera attachment from sleep mode to working mode.

Figure 21A:
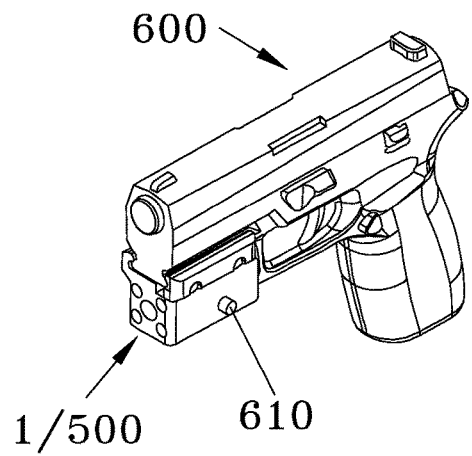

FIG. 21A is a right side perspective view of the firearm 300 and clamped LED sight camera attachment, with a magnetometer sensor in the internal circuit board, and an external magnet magnetically attached to the side of the attachment 1/500.

Figure 21B:
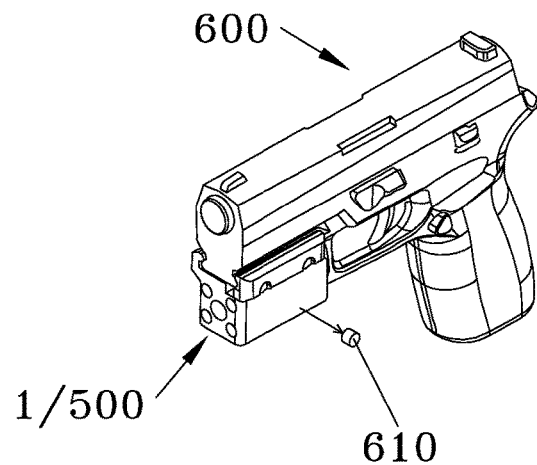

FIG. 21B is another perspective view of FIG. 21A with the external magnet pulled away from the side of the sight camera attachment.

Figure 22A:
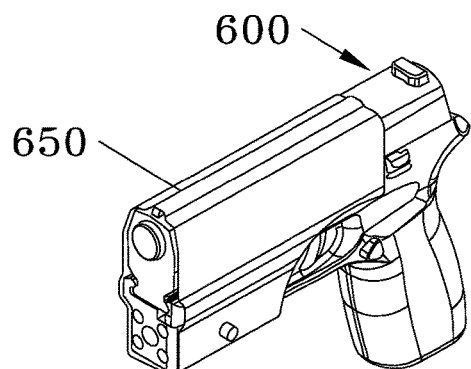

FIG. 22A is another embodiment showing a right side perspective view of the firearm 300 and clamped LED sight camera attachment, with a magnetometer sensor in the internal circuit board, and an external magnet attached to a holster which is adjacent the side of the attachment.

Figure 22B:
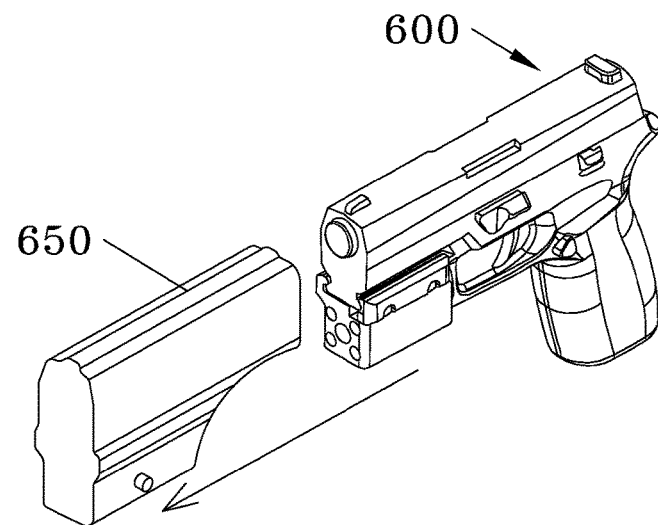

FIG. 22B is another perspective view of FIG. 22A with the holster having the magnet separated from the firearm and clamped LED sight camera attachment.

Figure 23A:
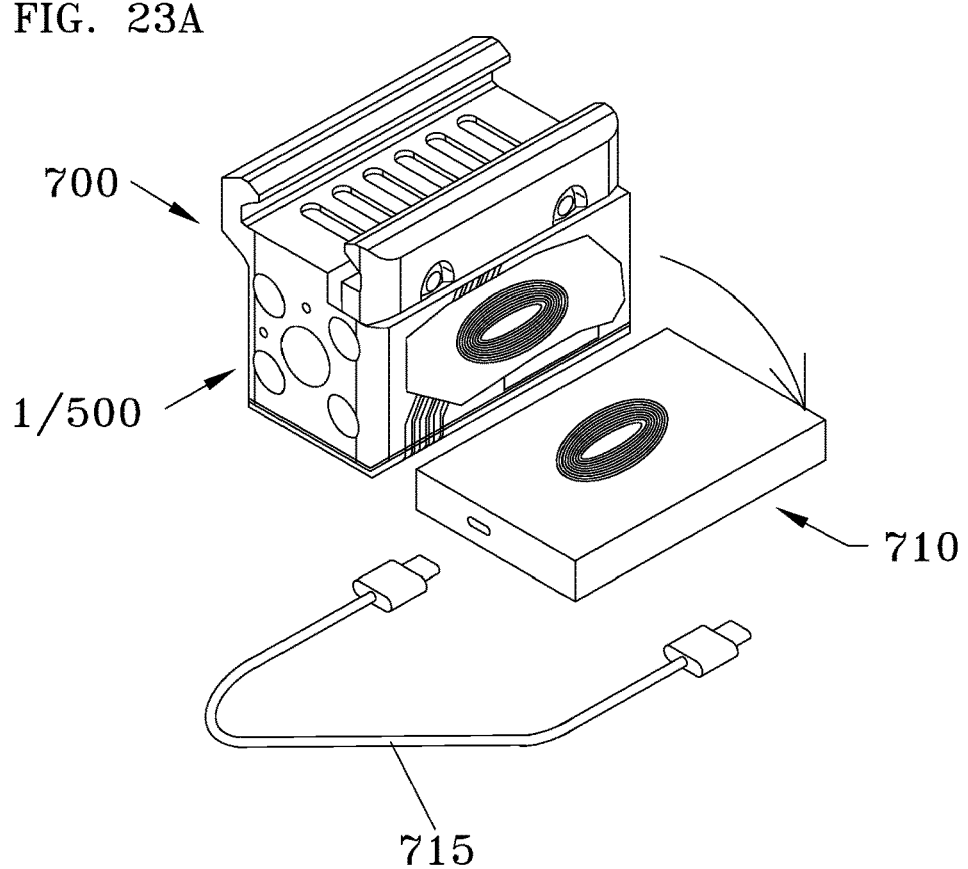

FIG. 23A is an upper front right perspective view of the LED sight camera attachment for a firearm with a battery charging circuit and separate wireless charging pad, and separate USB cable.

Figure 23B:
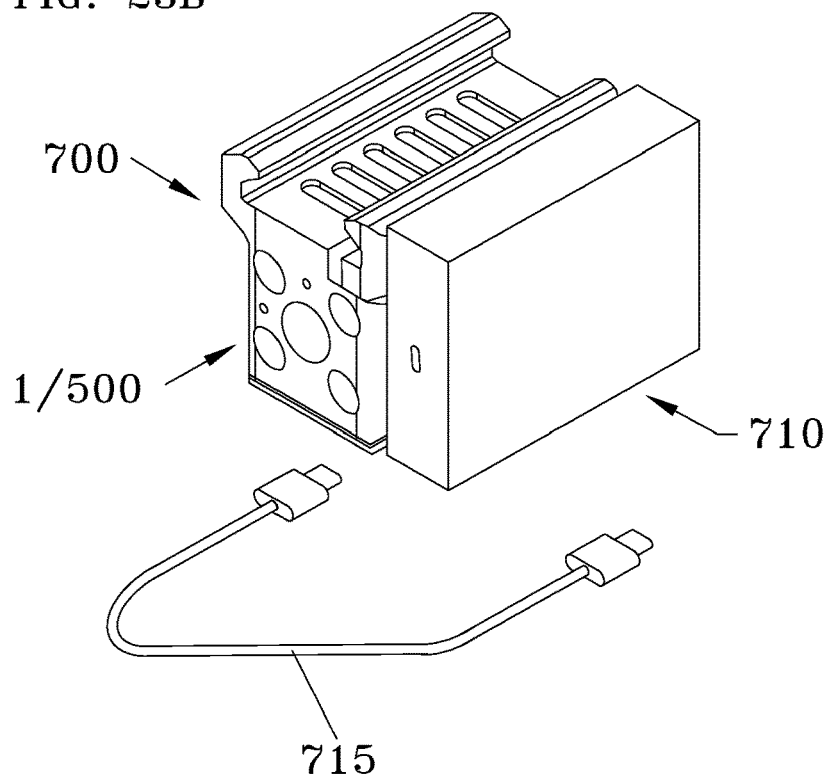

FIG. 23B is another perspective view of FIG. 23A with the LED sight camera attachment with the wireless charging pad in recharging position adjacent the attachment, and the recharging pad ready to be powered by the USB cable.

Figure 24A:
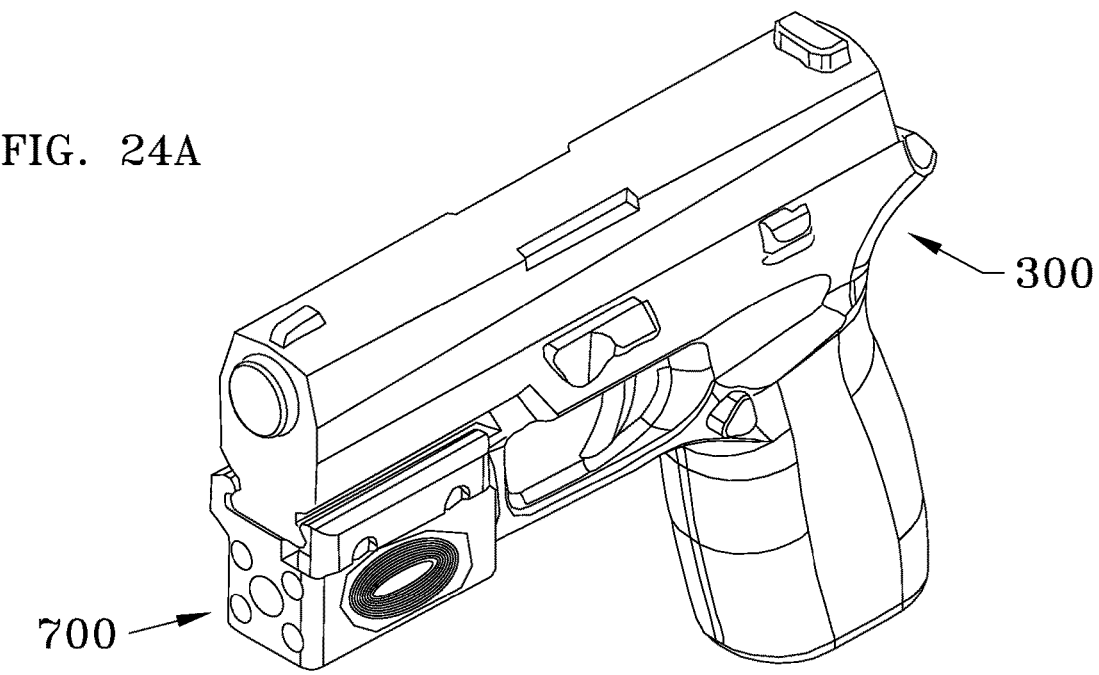

FIG. 24A is an upper front right perspective view of the LED sight camera attachment of FIG. 23A clamped to a firearm.

Figure 24B:
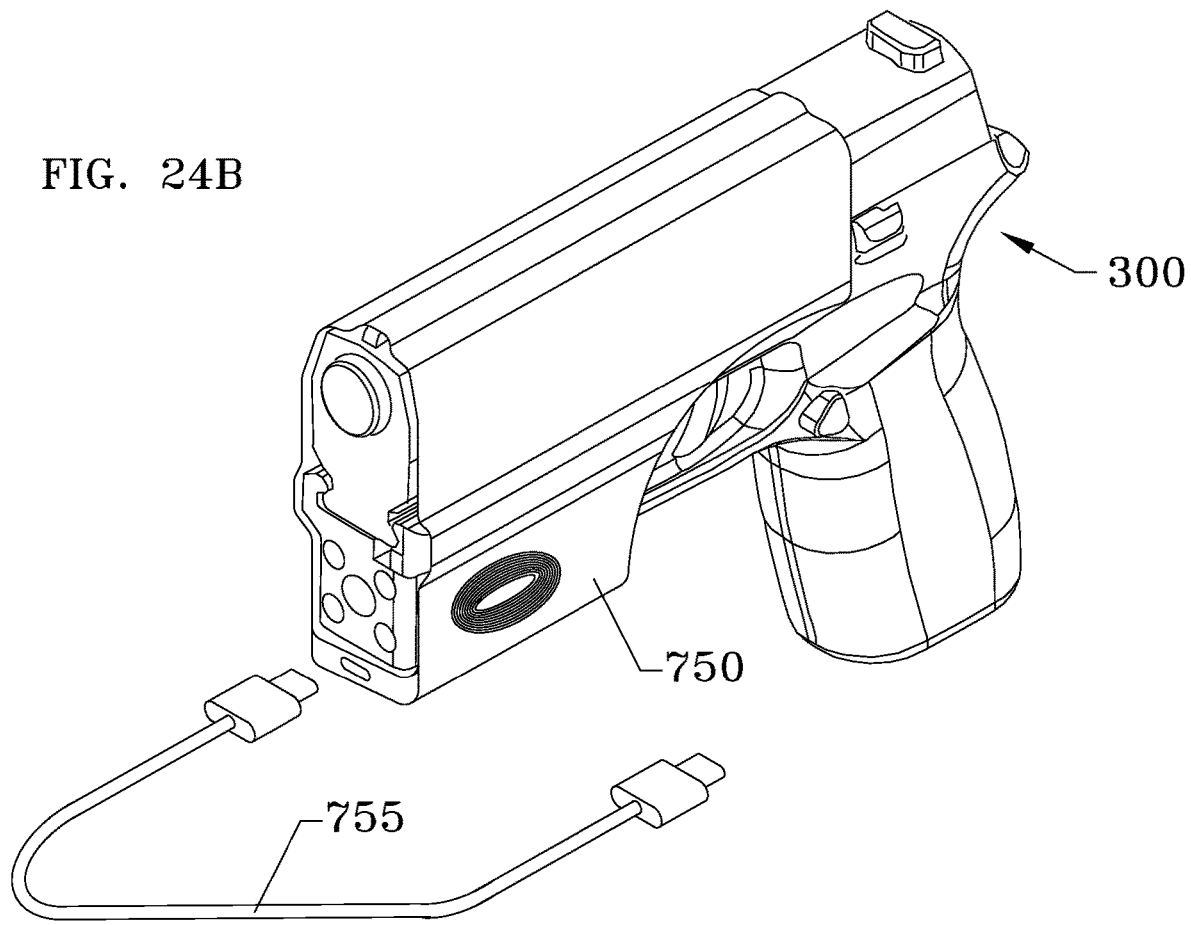

FIG. 24B is another perspective view of FIG. 24A with the LED sight camera attachment with the wireless charging pad on the firearm in a recharging position inside a holster with a recharging pad ready to be powered by a USB cable.

Figure 25A:
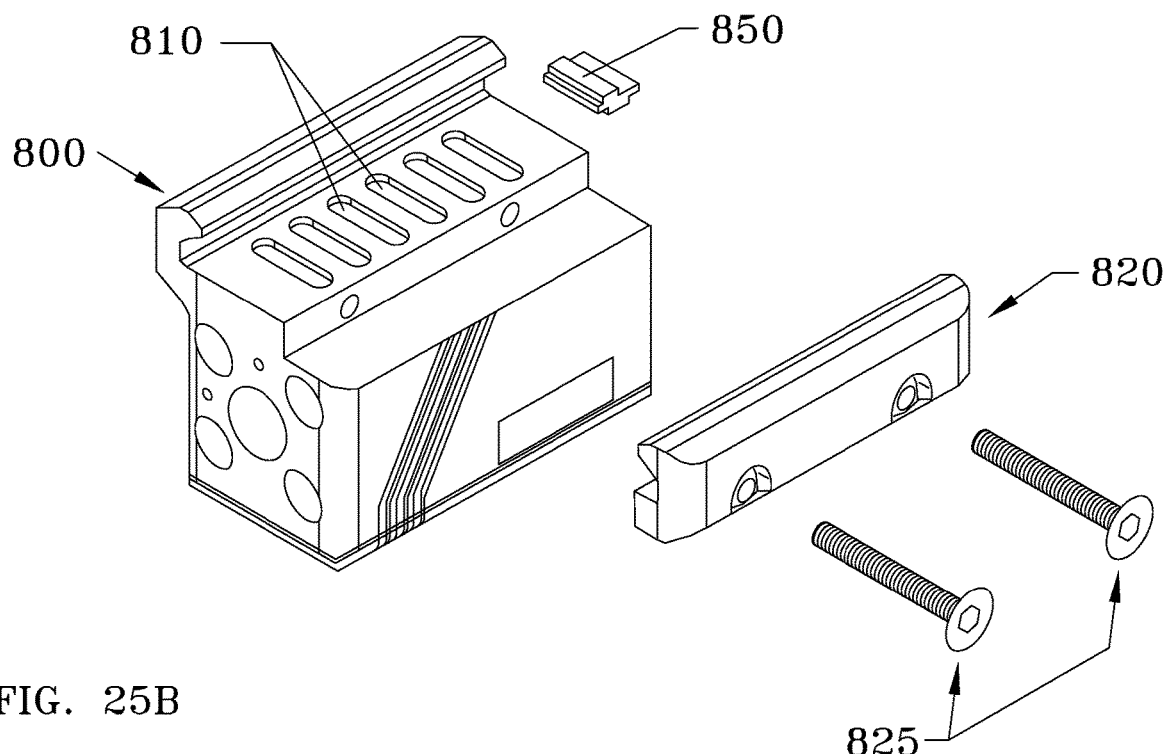

FIG. 25A is an upper right perspective view of a Multi-position locking rail mount LED sight camera attachment with separated rail key and attachable side rail.

Figure 25B:
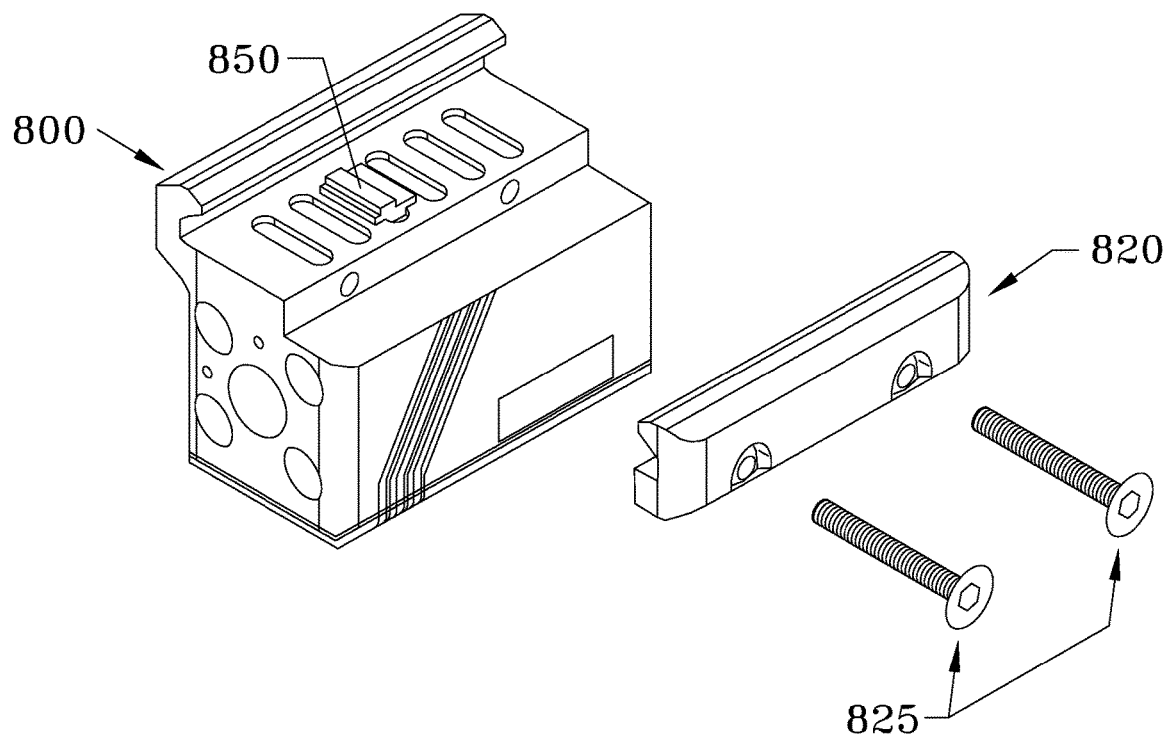

FIG. 25B is another perspective view of FIG. 25A with rail key attached to one of the key slots.

Figure 26A:
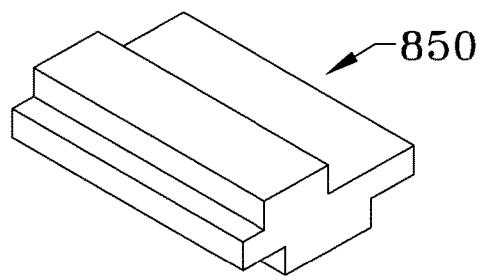

FIG. 26A is an upper front perspective view of the rail key shown in FIGS. 25A-25B.

Figure 26B:
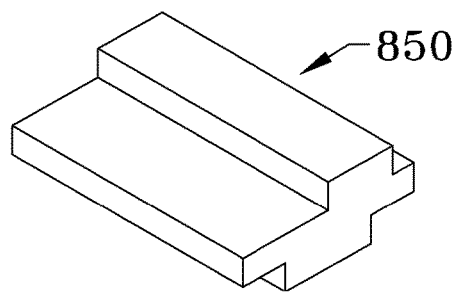

FIG. 26B is an upper rear perspective view of the rail key of FIG. 26A.

Figure 26E:
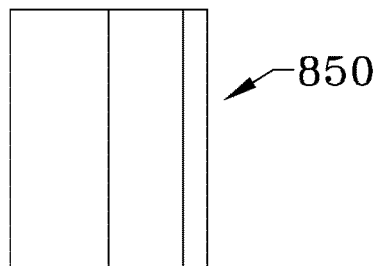
Figure 26F:
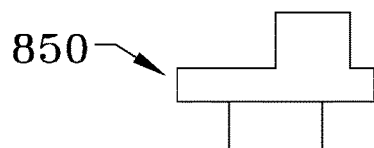
Figure 26G:
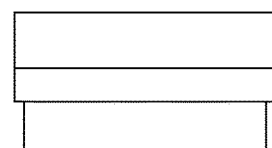
Figure 26C:
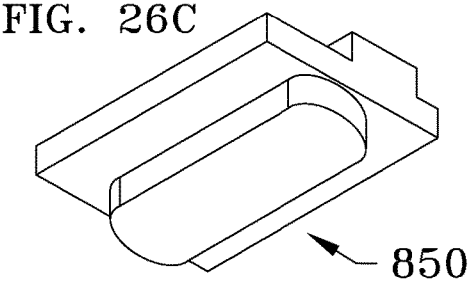

FIG. 26C is a bottom perspective view of the rail key of FIG. 26B

Figure 26H:
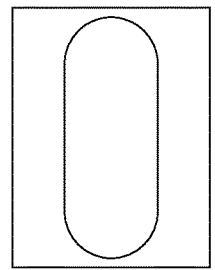
Figure 26D:
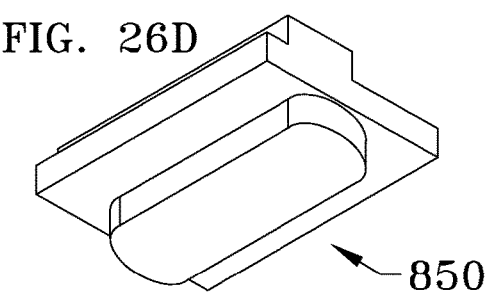

FIG. 26D is a bottom perspective view of the rail key of FIG. 26A.

FIG. 26E is a top side view of the rail key of FIG. 26A.
FIG. 26F is a left end view of the rail key of FIG. 26A.
FIG. 26G is a front end view of the rail key of FIG. 26A.
FIG. 26H is a bottom side view of the rail key of FIG. 26A.

Figure 27A:
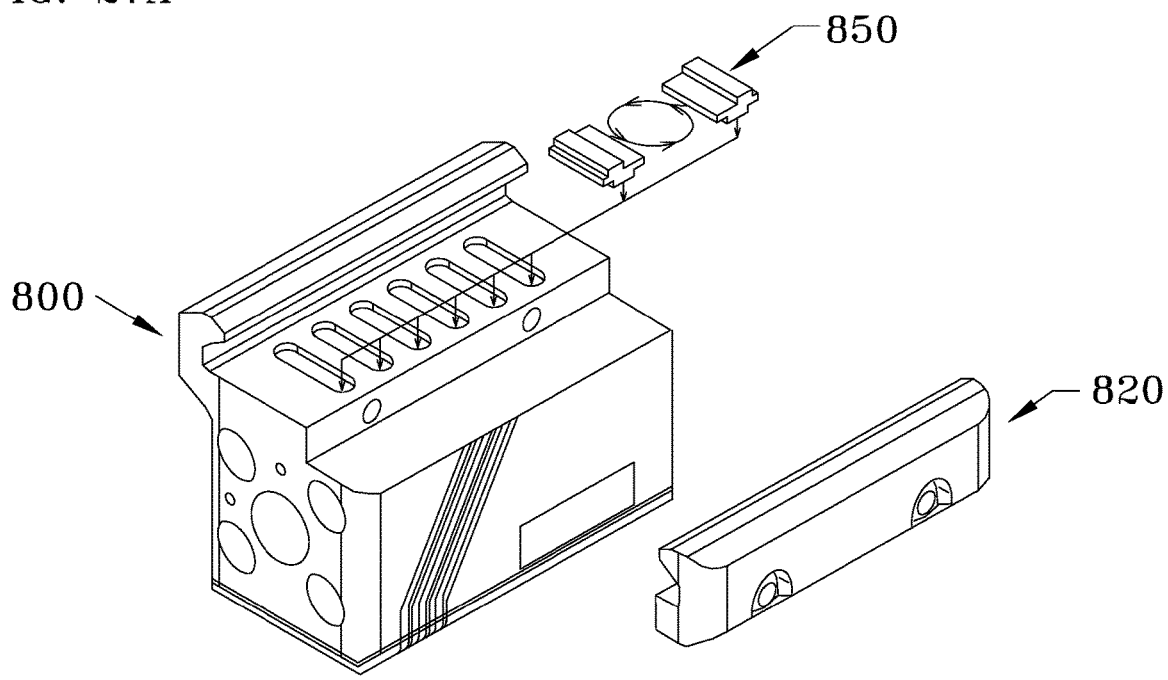

FIG. 27A is another upper right perspective view of the LED sight camera attachment of FIG. 25A showing the 12 different positions for the rail key.

Figure 27B:
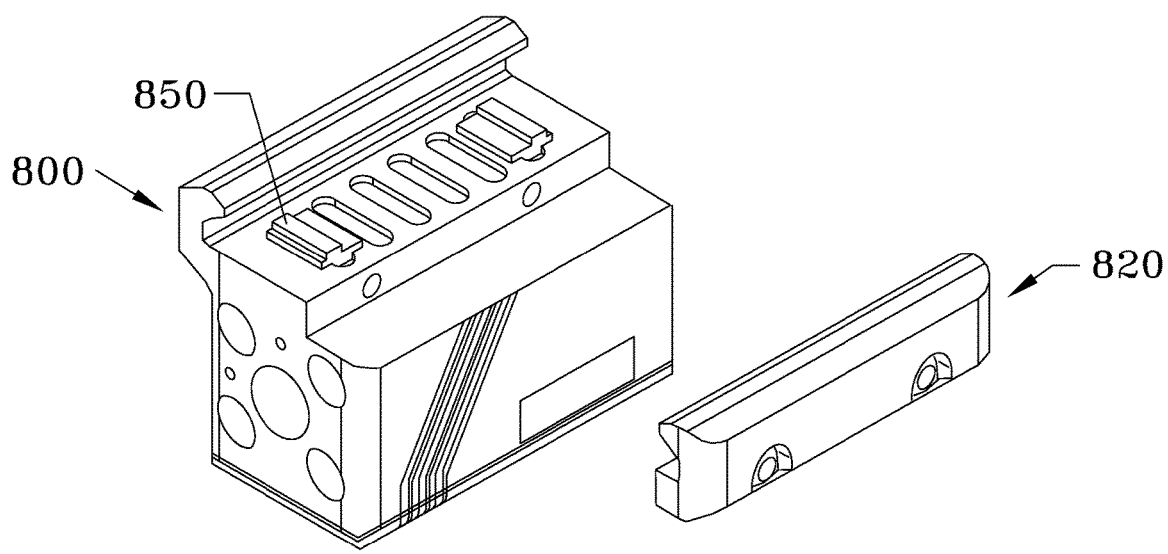

FIG. 27B is another view of FIG. 27A with the rail key in one slot of LED camera attachment.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1C:
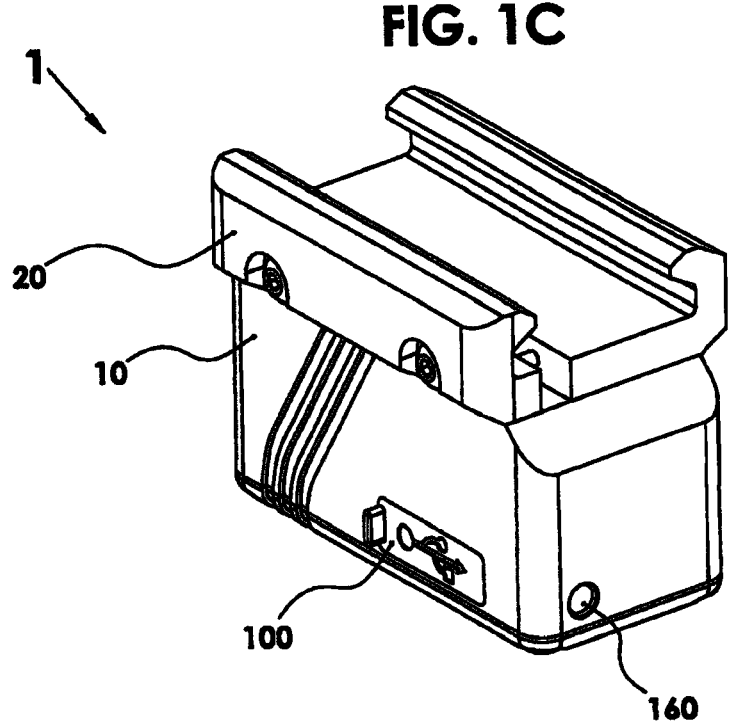
FIG. 1C is an upper rear left perspective view of the infrared LED sight camera attachment of FIG. 1A.
Figure 1D:
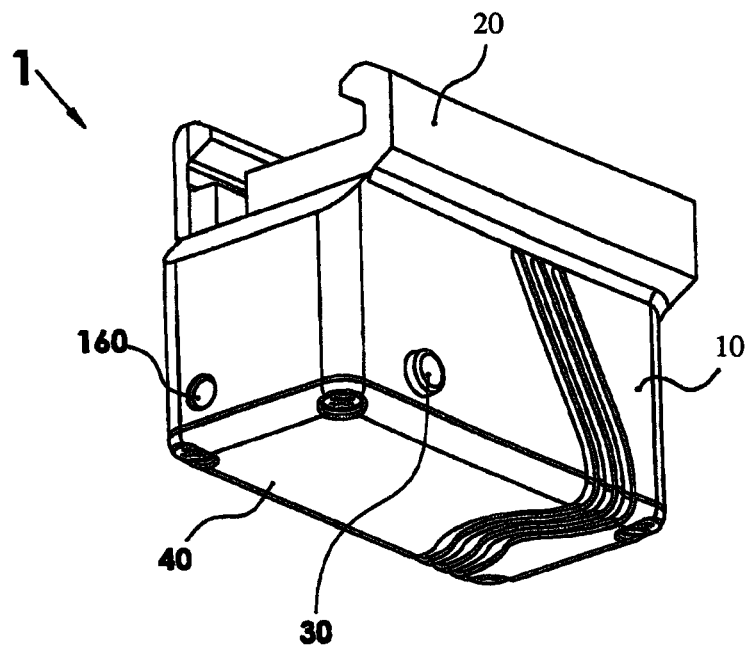
FIG. 1D is a lower rear right perspective view of the infrared LED sight camera attachment of FIG. 1A.

A list of components will now be described.
1 infrared LED sight camera attachment/device/system
10 main housing
20 moveable mounting rail(s)
30 power button
40 cover
50 lens, camera
60 camera adjustment adapter
62 tab
64 tab
70 lens for camera
80 wedge
90 gasket
100 USB cover
110 main circuit card assembly
120 IR LED circuit card assembly
130 batteries
140 camera
150 set screw for camera adjustment
160 power LED light pipe
170 mounting rail fasteners, such as screws and bolts
180 camera adjustment spring
190 mounting rail dowel pin(s)
200 cover screw
300 firearm
310 rails on firearm
400 portable digital display device
410 cross overlay for laying over target
450 target
500 Hybrid LED EMBODIMENT
600 Magnetometer Embodiment
610 Magnet 650 Holster with magnet
700 LED sight attachment with charging circuit
710 wireless charging pad
715 USB cable
750 holster with wireless charging pad
755 USB cable
800 Multi-position locking rail mount LED sight camera attachment/device/system
810 key slots
820 side rail
825 threaded fasteners (screw/bolt)
850 rail key FIG. 1A is an upper front right perspective view of the infrared LED sight camera attachment 1 for a firearm. FIG. 1B is a lower front right perspective view of the infrared LED sight camera attachment 1 of FIG. 1A. FIG. 1C is an upper rear left perspective view of the infrared LED sight camera attachment 1 of FIG. 1A. FIG. 1D is a lower rear right perspective view of the infrared LED sight camera attachment 1 of FIG. 1A.

Referring to FIGS. 1A-1D, the assembled infrared LED sight camera attachment 1 can include a generally rectangular box shaped main housing 10, with a top having a pair of rails with one fixed and the other mounting rail 20 being moveable, with a front end having a camera lens 50 surrounded by a plurality of light sources 70, such as infrared (IR) light emitting diodes (LEDs) 70, back end with light pipe 160, and the bottom of the housing 10 having a removable cover 40. A power button 30 can be located on one side of the housing 10 with a USB cover 100 on the opposite side.

Figure 2:
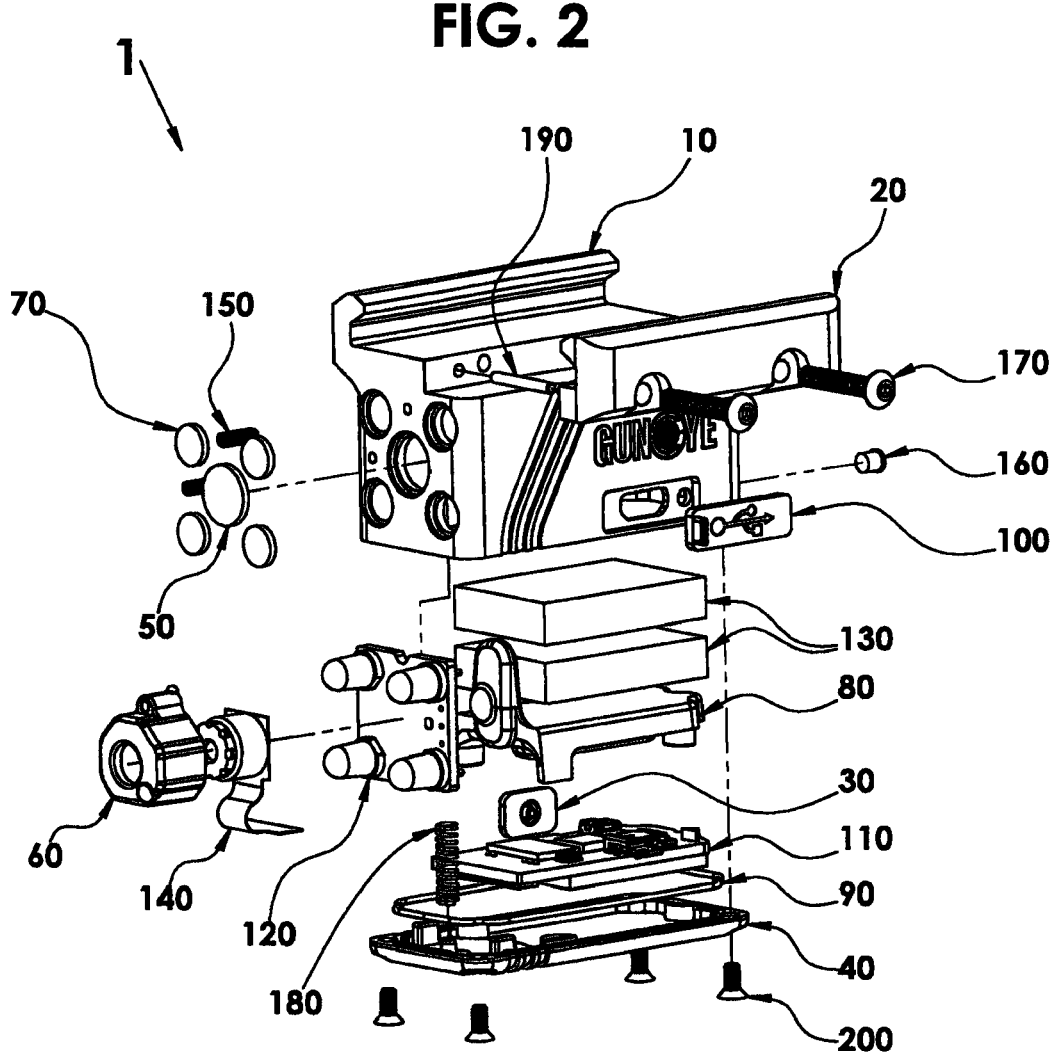
FIG. 2 is an exploded view of the infrared LED sight camera attachment of FIG. 1A.

FIG. 2 is an exploded view of the infrared LED sight camera attachment 1 of FIG. 1A.

Figure 3A:
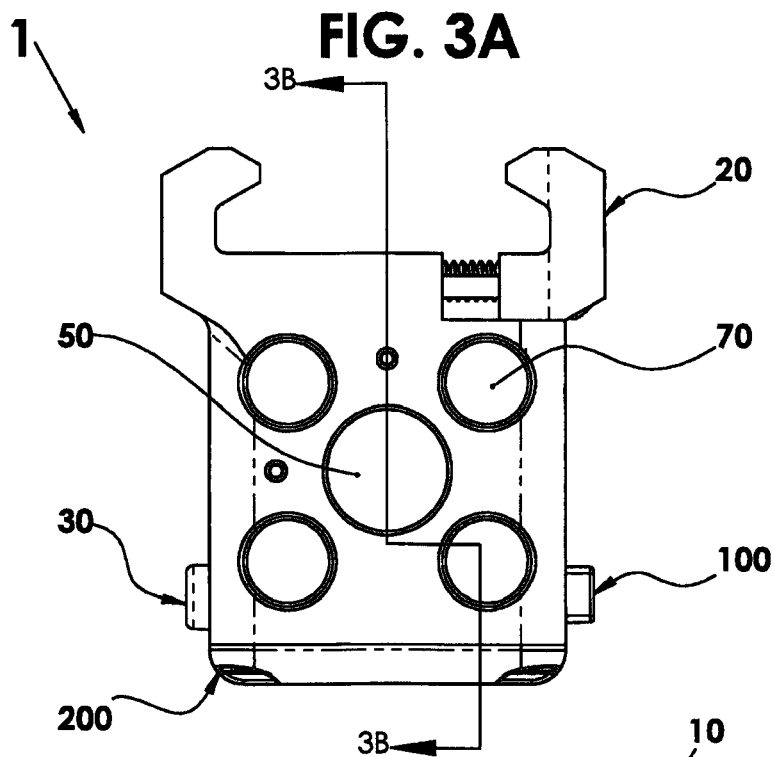
FIG. 3A is a front view of the infrared LED sight camera attachment of FIG. 1A.
Figure 3B:
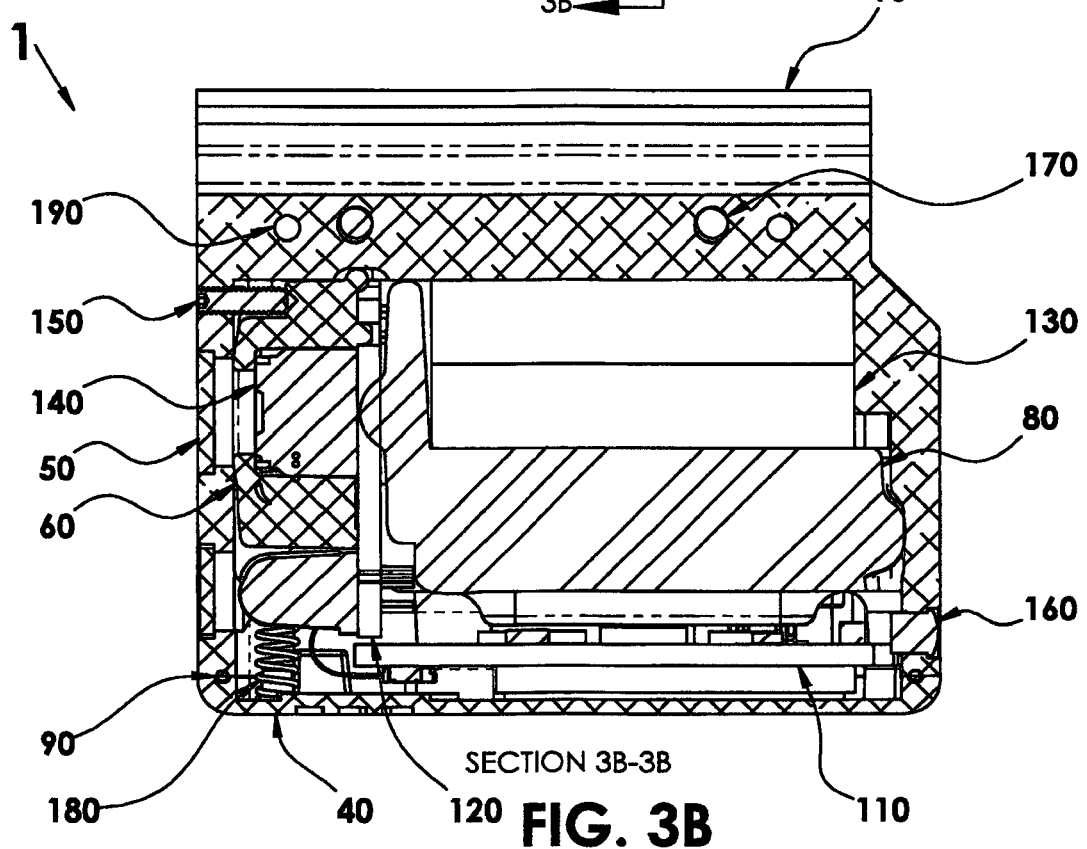
FIG. 3B is a cross-sectional view of the infrared LED sight camera attachment of FIG. 3A along arrows 3B.

FIG. 3A is a front view of the assembled infrared LED sight camera attachment 1 of FIG. 1A. FIG. 3B is a cross-sectional view of the infrared LED sight camera attachment 1 of FIG. 3A along arrows 3B.

Referring to FIGS. 1A-2, the moveable mounting rail 20 can move toward and away from a top side of the housing 10 by a pair of mounting rail fasteners 170, such as screws or bolts, and with mounting rail dowel pin 190.

Dowel pins can be used to align and stabilize movable mounting rail 20 during tightening and while tightened.

On the front end of the housing 10 can be four indented sockets for receiving four infrared (IR) light emitting diode (LED) lens 70 arranged in a rectangular pattern. In the middle of the lens 70 can be camera lens 50 also positioned in an indentation on the front of the housing 10.

Figure 11B:
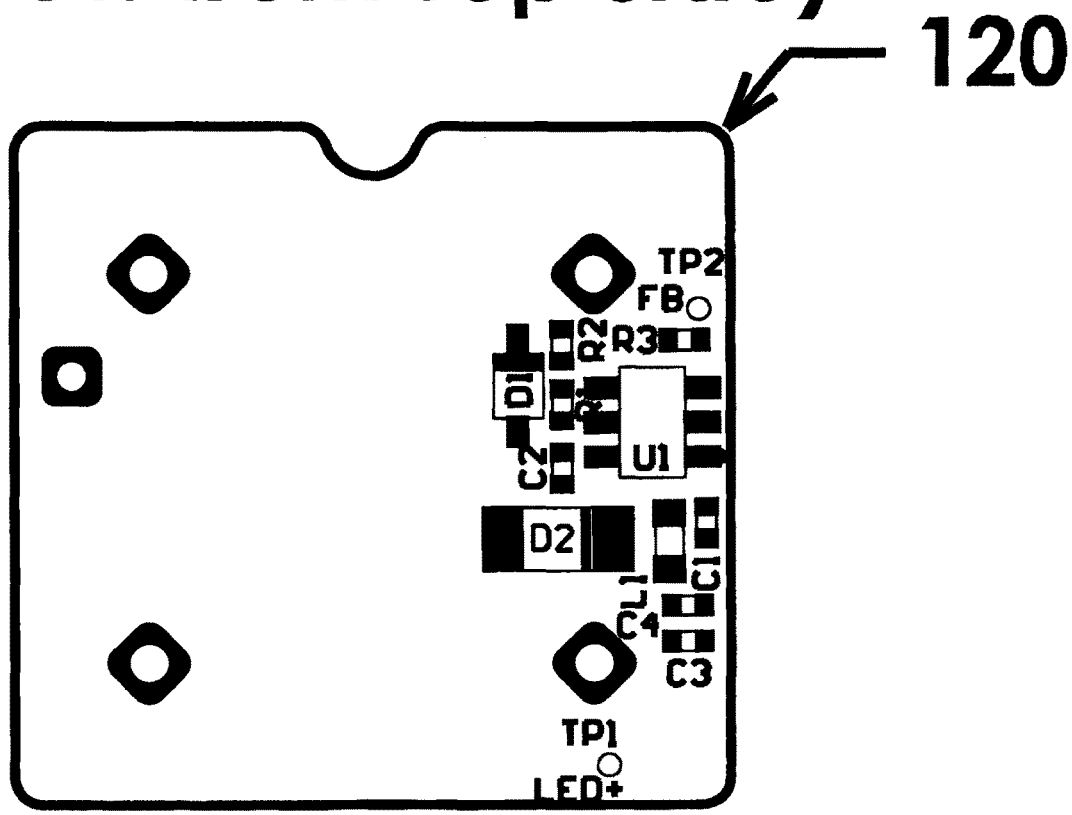
FIG. 11B is a rear view of the IR LED circuit card assembly of FIG. 11A.

An IR LED circuit card assembly 120 can be positioned behind the front wall of the housing 10, which is shown in FIGS. 11A, 11B and 12. A camera chip on the circuit board assembly is monitored for ambient light level and during low light conditions it automatically switches the camera to monitor and stream only Infrared light spectrum video and switches on the IR LED circuit for low light illumination, down to and including total darkness.

A camera adjustment adapter 60 also be positioned behind the front wall of the housing 10 with a camera 140 sandwiched between the IR LED circuit card assembly 10. Set screws 150 can be used for adjustment of the camera 140. The camera 140 is shown more clearly in FIGS. 5A-5D. A camera adjustment spring 180 sits on a top of cover 40. The camera adjustment adapter 60 with tabs 62, 64 is shown more clearly in FIGS. 6A-6G.

The camera chip/lens configuration has a set field of view to optimize the size of the image on smart device, etc. for better target identification/clarity.

It is also devoid of the standard IR filter to allow IR viewing and streaming of IR spectrum video. Camera clarity can also be controlled by electronic auto-focus.

The windage (horizontal) and elevation (vertical) adjustment screws 150 in tabs 62, 64 can adjust the camera 140 to align point of impact with smart device chosen reticle superimposed on the screen. The springs dampen the camera unit and hold tension to hold the camera in position set by turning the screws in either a clockwise or counter clockwise to align.

A pair of replaceable batteries 130 can be supported inside of the housing 10 by wedge 80. The replaceable batteries can be recharged by plugging a charging micro USB charger (phone/tablet/etc.) into the port under the rubber boot which is the USB cover 100. This port can also allow for downloading of stored video on device, less audio. (audio only recorded on smart device).

Removable fasteners 200, such as screws and bolts, can be used to attach and detach the cover 40 from the open bottom of the housing 10, with a gasket 90 therebetween. The gasket is further shown in FIGS. 7A-7D, and cover 40 is further shown in FIGS. 8A-8G. There are no "end user" serviceable parts inside the unit. Gasket 90 can be a pliable rubber or elastomer type material that can provide a water type seal for the cover 40 when it is attached by the fasteners 200 to the bottom of the housing 10.

A main circuit card assembly 110 can be positioned beneath the wedge 80, and is further shown in relation to FIGS. 9A-10B. The USB cover 100 protects port from moisture and dust/dirt.

To download video files from the assembled infrared LED sight camera attachment (unit) 1, a user can connect a line, such as a micro USB data cable to device and standard USB end of cable to personal computer (PC) or MAC. The unit will show up similar to a thumb/flash drive. Next, the user can download or view files on the PC or MAC. Generally, the assembled infrared LED sight camera attachment 1 will NOT have audio. The App referenced in FIGS. 16, 17 and 18 can be set in settings to automatically save video and audio to a portable digital device 400, such as a smart phone, smart watch or virtual reality glasses, and the like.

The power LED pipe 160 is a fiber optic tube to transfer multicolor LED signal from the main circuit board to be visible on rear of the unit by user only.

FIG. 4A is a lower front right perspective view of the wedge 80 for the infrared LED sight camera attachment 1 of FIG. 1A. FIG. 4B is an upper rear left perspective view of the wedge 80 of FIG. 4A. FIG. 4C is an upper front right perspective view of the wedge 80 of FIG. 4A. FIG. 4D is a lower rear right perspective view of the wedge 80 of FIG. 4A. FIG. 4E is a front view of the wedge 80 of FIG. 4A. FIG. 4F is a right side view of the wedge 80 of FIG. 4A. FIG. 4G is a rear view of the wedge 80 of FIG. 4A. FIG. 4H is a bottom view of the wedge 80 of FIG. 4A. FIG. 4I is a top view of the wedge 80 of FIG. 4A.

Referring to FIGS. 1A-4I, the wedge 80 is used to support the batteries 130 inside the upper part of the housing 10. The wedge 80 also can be used to protect and separate the batteries 130 from the circuit boards 110, 120 to dampen recoil damage and/or thermal insulation.

Figure 5A:
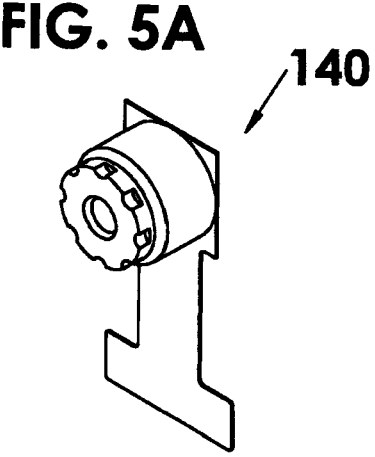
FIG. 5A is a front right perspective view of camera used in the infrared LED sight camera attachment of FIG. 1A.
Figure 5B:
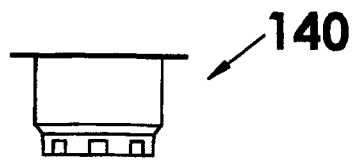
FIG. 5B is a top view of the camera of FIG. 5A.
Figure 5C:
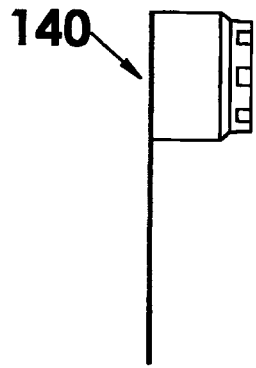
FIG. 5C is a left side view of the camera of FIG. 5A.
Figure 5E:
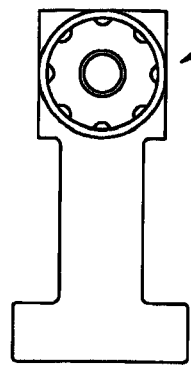
FIG. 5E is a front view of the camera of FIG. 5A.
Figure 5D:
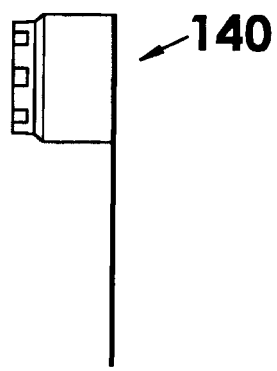
FIG. 5D is a right side view of the camera of FIG. 5A.

FIG. 5A is a front right perspective view of camera 140 used in the infrared LED sight camera attachment of 1 FIG. 1A. FIG. 5B is a top view of the camera 140 of FIG. 5A. FIG. 5C is a left side view of the camera 140 of FIG. 5A. FIG. 5D is a right side view of the camera 140 of FIG. 5A. FIG. 5E is a front view of the camera 140 of FIG. 5A.

Figure 6A:
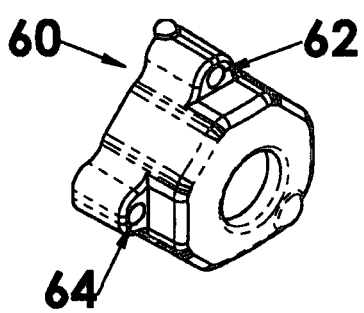
FIG. 6A is an upper front left perspective view of the camera adjustment adapter used in the infrared LED sight camera attachment of FIG. 1A.
Figure 6B:
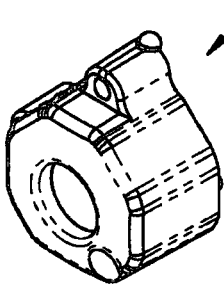
FIG. 6B is an upper front right perspective view of the camera adjustment adapter of FIG. 6A.
Figure 6C:
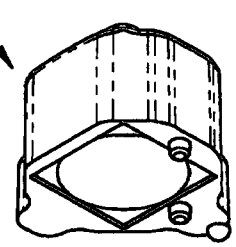
FIG. 6C is a lower rear perspective view of the camera adjustment adapter of FIG. 6A.
Figure 6D:
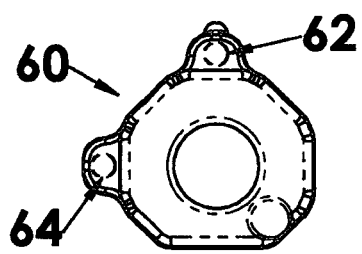
FIG. 6D is a front view of the camera adjustment adapter of FIG. 6A.
Figure 6E:
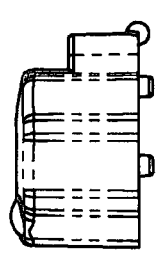
FIG. 6E is a right side view of the camera adjustment adapter of FIG. 6A.
Figure 6F:
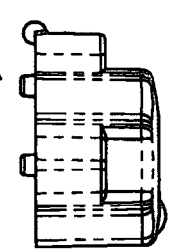
FIG. 6F is a left side view of the camera adjustment adapter of FIG. 6A.
Figure 6G:
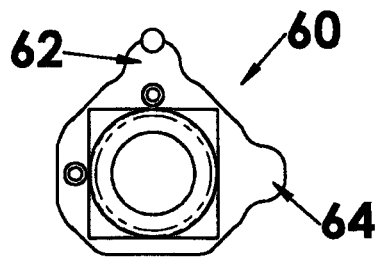
FIG. 6G is a rear side view of the camera adjustment adapter of FIG. 6A.

FIG. 6A is an upper front left perspective view of the camera adjustment adapter 60 with tabs 62, 64 used in the infrared LED sight camera attachment 1 of FIG. 1A. FIG. 6B is an upper front right perspective view of the camera adjustment adapter 60 of FIG. 6A. FIG. 6C is a lower rear perspective view of the camera adjustment adapter 60 of FIG. 6A. FIG. 6D is a front view of the camera adjustment adapter 60 of FIG. 6A. FIG. 6E is a right side view of the camera adjustment adapter 60 of FIG. 6A. FIG. 6F is a left side view of the camera adjustment adapter 60 of FIG. 6A. FIG. 6G is a rear side view of the camera adjustment adapter 60 of FIG. 6A.

Figure 7B:
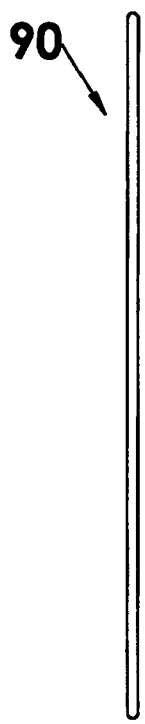
FIG. 7B is a left side view of the gasket of FIG. 7A.
Figure 7A:
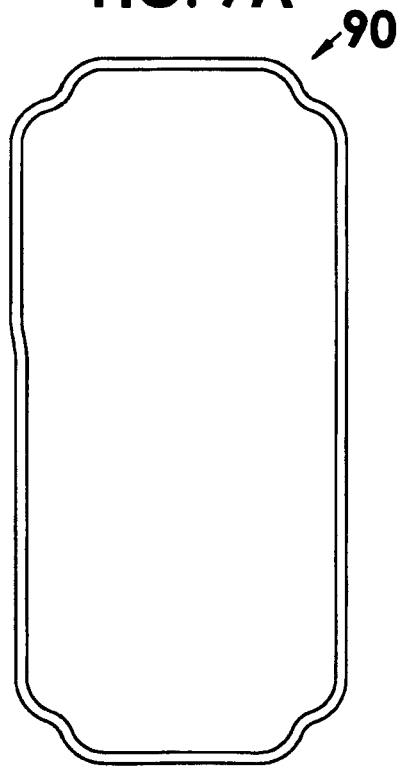
FIG. 7A is a front view of the gasket used in the infrared LED sight camera attachment of FIG. 1A.
Figure 7C:
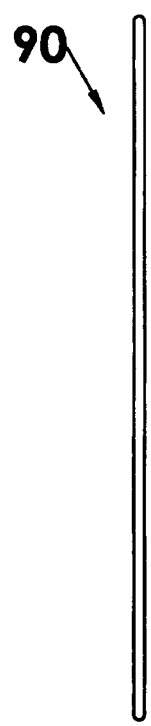
FIG. 7C is a right side view of the gasket of FIG. 7A.
Figure 7D:
FIG. 7D is a top view of the gasket of FIG. 7A.

FIG. 7A is a front view of the gasket 90 used in the infrared LED sight camera attachment 1 of FIG. 1A. FIG. 7B is a left side view of the gasket 90 of FIG. 7A. FIG. 7C is a right side view of the gasket 90 of FIG. 7A. FIG. 7D is a top view of the gasket 90 of FIG. 7A.

FIG. 8A is a front right perspective view of the cover 40 for the infrared LED sight camera attachment 1 of FIG. 1A. FIG. 8B is a rear left perspective view of the cover 40 of FIG. 8A. FIG. 8C is a front view of the cover 40 of FIG. 8A. FIG. 8D is a left side view of the cover 40 of FIG. 8A.

FIG. 8E is a right side view of the cover 40 of FIG. 8A. FIG. 8F is a rear view of the cover 40 of FIG. 8A. FIG. 8G is a top view of the cover 40 of FIG. 8A. The cover 40 can also made of a polymer material instead of aluminum or any other metal to allow for better WIFI/BLUETOOTH connection.

Figure 9A:
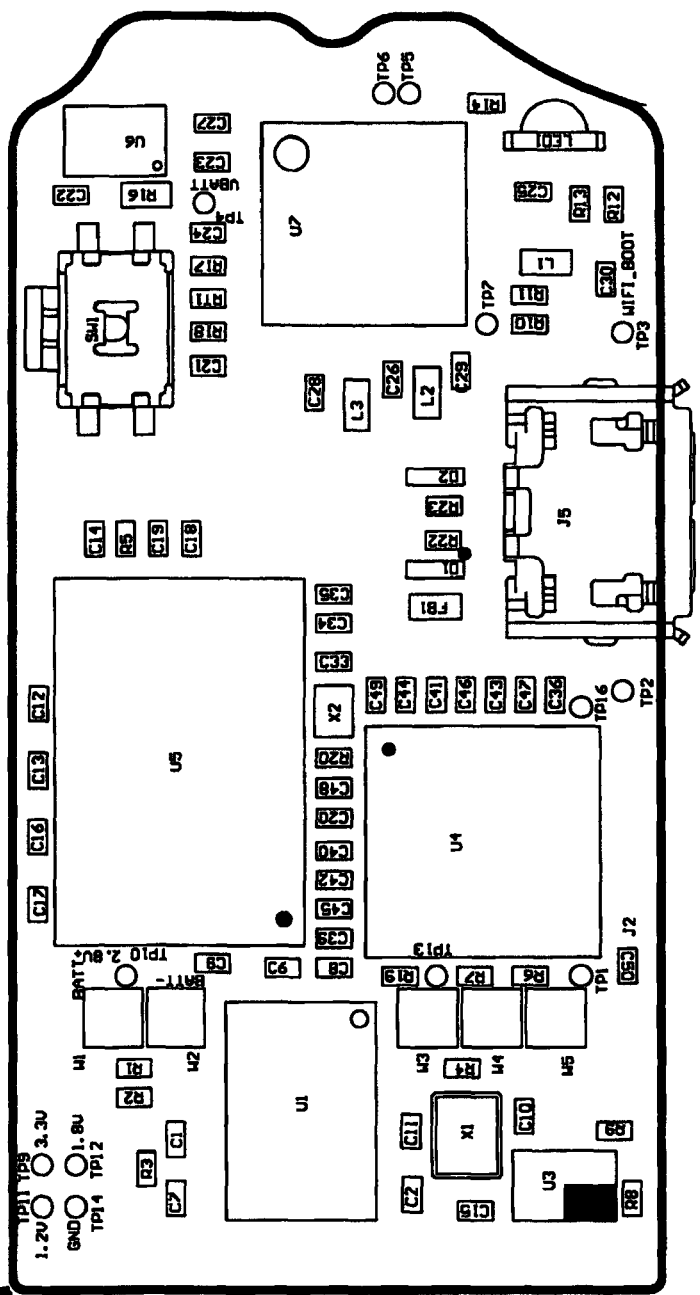
FIG. 9A is an enlarged top view of the main circuit card assembly used in the infrared LED sight camera attachment of FIG. 1A.
Figure 9B:
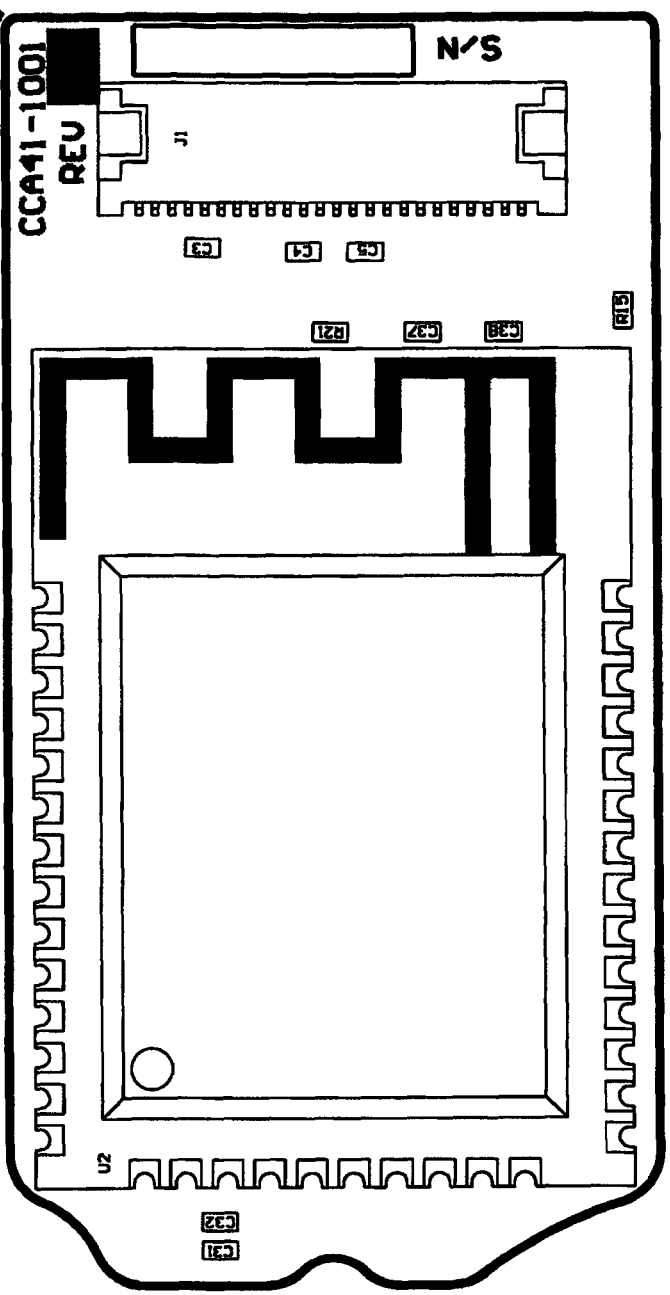
FIG. 9B is a bottom view of the main circuit card assembly of FIG. 8A.

FIG. 9A is an enlarged top view of the main circuit card assembly 110 used in the infrared LED sight camera attachment 1 of FIG. 1A. FIG. 9B is a bottom view of the main circuit card assembly 110 of FIG. 8A.

FIG. 10A is a first table of the electrical components used in the main circuit card assembly 110 of FIGS. 9A-9B. FIG. 10B is a second table of the electrical components used in the main circuit card assembly 110 of FIGS. 9A-9B.

FIG. 11A is an enlarged front view of the IR LED circuit card assembly 120 for the infrared LED sight camera attachment 1 of FIG. 1A. FIG. 11B is a rear view of the IR LED circuit card assembly 120 of FIG. 11A.

FIG. 12 is a table of the electrical components used in the IR LED circuit card assembly 120 of FIGS. 11A-11B.

FIG. 13A is a front view of the infrared LED sight camera attachment 1 of FIG. 1A slid over rails 310 under a barrel of a handgun firearm 300 prior to clamping to the rails 310. The firearm 300 can include a handgun revolver, semi-automatic handgun, and the like.

FIG. 13B is another view of the infrared LED sight camera attachment 1 of FIG. 13A clamped to the rails 310 on the firearm 300 by moving the moveable mounting rail 20 onto the rails 310 on the handgun 300.

Figure 14A:
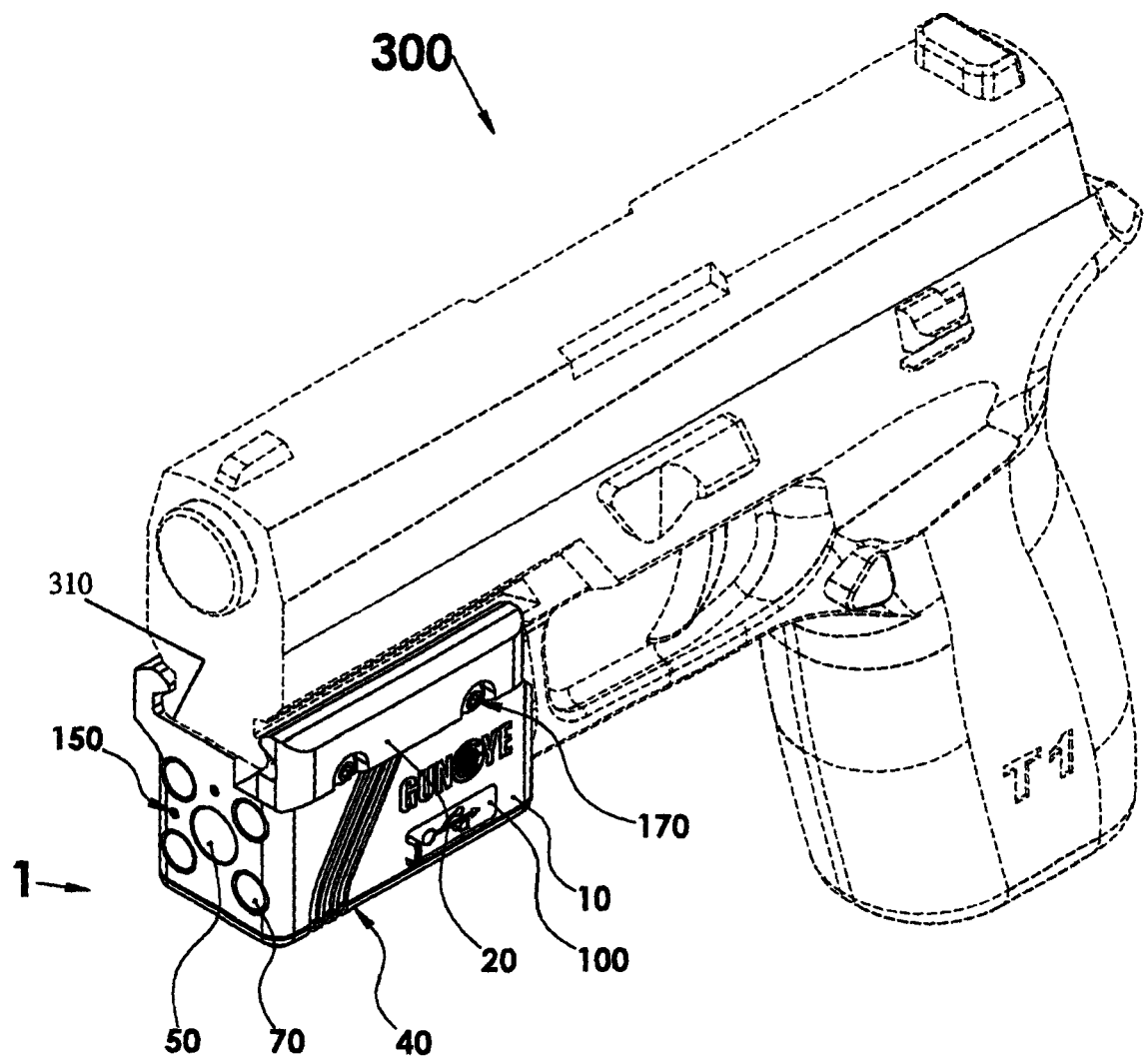
FIG. 14A is a right perspective view of FIGS. 13A-13B of the firearm with clamped infrared LED sight camera attachment.
Figure 14B:
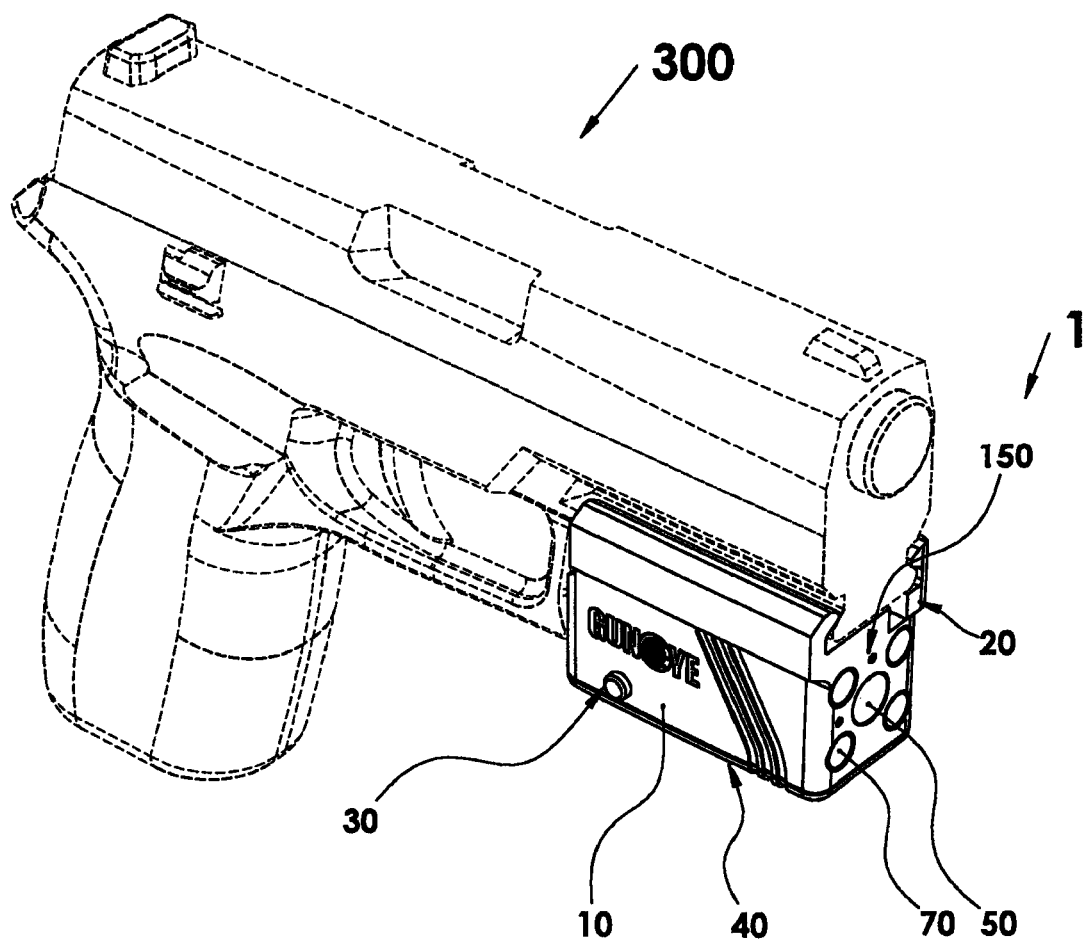
FIG. 14B is a left perspective view of the firearm with clamped infrared LED sight camera attachment of FIG. 14A.

FIG. 14A is a right perspective view of FIGS. 13A-13B of the firearm 300 with clamped infrared LED sight camera attachment 1. FIG. 14B is a left perspective view of the firearm 300 with clamped infrared LED sight camera attachment 1 of FIG. 14A.

FIG. 15 shows the firearm 300 with clamped infrared LED sight camera attachment 1 of FIGS. 13A-14B with a portable digital device 400, that can include a smart phone displaying a target 450 while the shooter holding the firearm 300 and portable digital device 400 is out of the target's view. Here, only the hand of the shooter holding the firearm 300 is exposed to an armed target. A cross hair target overlay 410 can be laid over the target 450 on the display screen of the portable digital display device 400. The Target overlay 410 can be centered on the display of the portable digital device 400 by the APP. In the settings mode, the oversized video block can be moved to align with the centered overlay. (similar to using Google map) The Oversized video block can be much larger than the screen to allow the user to basically move the picture behind the window.

When being used, the camera 140 in the infrared LED sight camera attachment can send a live feed such as a live video stream through a wireless medium, such as but not limited to WIFI/BLUETOOTH to the portable digital display device.

Figure 16:
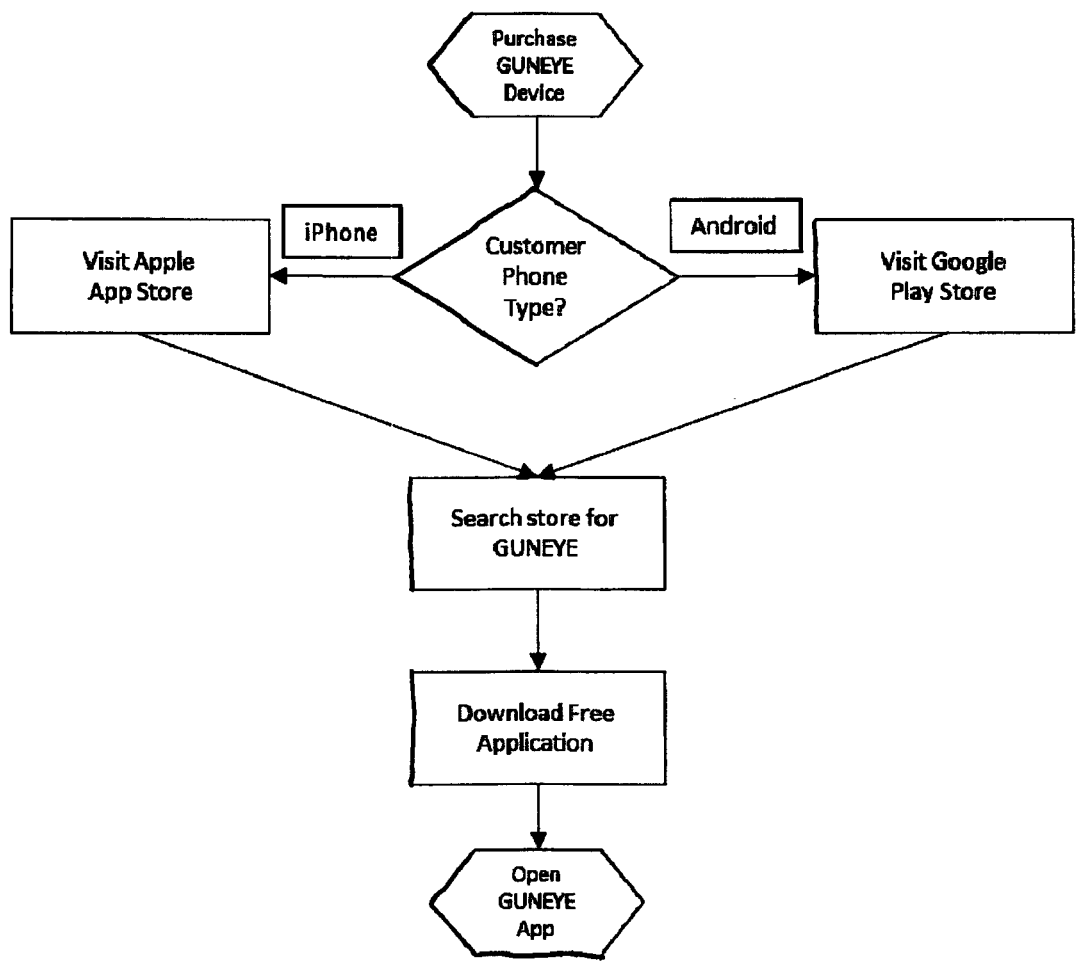
FIG. 16 is a flowchart of the app being installed on a smart phone shown in FIG. 15.

FIG. 16 is a flowchart of the app being installed on a smart phone shown in FIG. 15. An App having software can be purchased through sellers such as an APPLE® App store or an App for an android smart phone purchased for example, at GOOGLE® Play Store.

Figure 17:
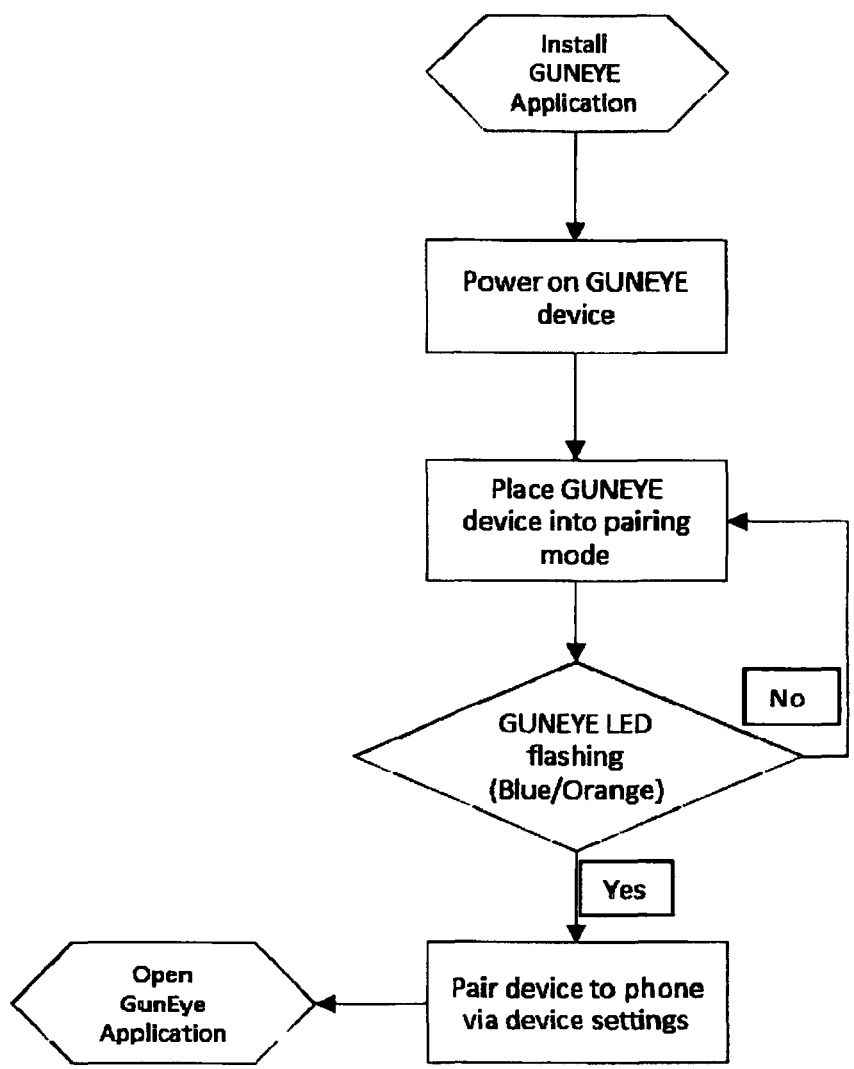
FIG. 17 is a flow chart of the initial setup of the App of FIG. 16.

FIG. 17 is a flow chart of the initial setup of the App of FIG. 16.

Figure 18:
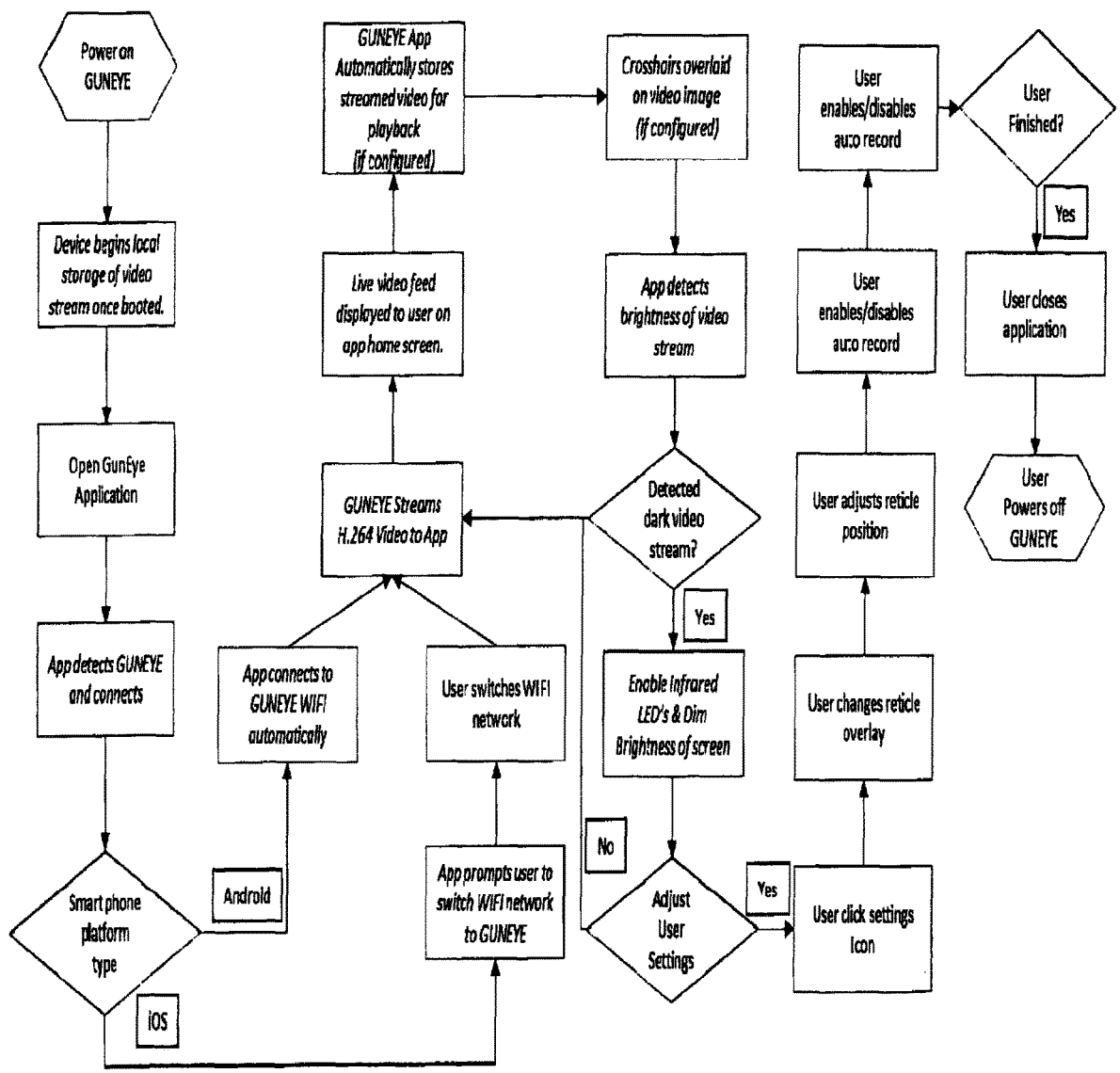
FIG. 18 is a flow chart running the App for the infrared LED sight camera attachment and smart phone of FIGS. 15-17.

FIG. 18 is a flow chart running the software App for the infrared LED sight camera attachment and smart phone of FIGS. 15-17. Although the portable digital display device is described in the embodiment as being a smart phone, the portable digital display device can be a smart watch, VR (virtual reality) glasses, tablet, IPAD, dedicated wrist display, and the like, and can work on most devices using android or iOS APPs.

Selectable Illumination of Either Visible White Light or Non-Visible Infrared:

FIG. 19A is an upper front right perspective view of the infrared LED sight camera attachment 1 for a firearm of the previous embodiment.

FIG. 19B is an upper front right perspective view of a hybrid embodiment 500 of FIG. 19A using two infrared LEDs 70IR and two visible white light LEDs 70V.

The white LEDs (light emitting diodes) can be approximately 5,000 to approximately 6,000 kelvin each.

Some law enforcement agencies have required white light LEDS on their weapon sights. And using white LEDs can meet the law enforcement requirements.

FIG. 19C is another upper front right perspective view of another hybrid embodiment 550 of FIG. 19A using all four visible white LEDs 70V.

The current 4 nonvisible infrared LEDs will now have the option of being a hybrid system of either 2 infrared LEDs and 2 visible white light LEDs or all 4 visible white LEDs.
Version 1

Use current circuit board. with four LEDS. As shown in FIG. 19A.

For hybrid embodiment 500 in FIG. 19B, we change two bottom LEDS to be a bright white light (visible) 70V, and keep top two LEDS, infrared 70IR.

We can switch back and forth between top pair and bottom pair, as needed.
Version 2

Change All four LEDS to become bright white light (visible) 70V, with no infrared LEDS, as shown in FIG. 19C.

Motion Initiated Wake-Up of Device:

FIG. 20A is a rear perspective view of a firearm 300 with clamped LED sight camera attachment 1/500 held by a user moved side to side in the direction of arrow M to activate the LED sight camera attachment 1/500 from sleep mode to working mode.

FIG. 20B is a right side perspective view of the firearm 300 with clamped LED sight camera attachment 1/500 of FIG. 20A being moved forward in the direction of arrow F to activate the LED sight camera attachment from sleep mode to working mode.

FIG. 20C is a top right side perspective view of the firearm with clamped LED sight camera attachment of FIG.

20A being lifted in a clockwise direction to activate the LED sight camera attachment from sleep mode to working mode.

Referring to FIGS. 20A, 20B, 20C, and we have added a motion sensor chip to the circuit board shown in FIGS. 9A, 9B, 11A-11B to measure motion of the device 1.

Such a motion sensor chip to be used, can include, but not be limited to the motion sensors shown and described in U.S. Published Patent Applications: 2007/0024587 to Shiau and 2018/0302559 to Lee, which are each incorporated by reference in their entirety.

This feature will allow the device 1 to wake up from low power sleep mode and start running when the device 1 is moved in a previously programmed motion.

Motion profiles such as being drawn from a holster, FIG. 20C and rotated FIG. 20A to pointing forward FIG. 20B are examples of how this feature enhance the startup performance of the device 1. The sleep mode allows the battery power to be conserved during nonuse of device 1.

The motion sensor chip can be used as a replacement for a manual push button to start the device 1. Alternatively, the motion sensor chip can be used in in addition to a manual push button to start the device 1.

The data from this sensor can be recorded and be used to document the actual motion of the device 1 in training and post use reviews.

As a training tool, the data from the motion sensor can be used to verify proper protocols and procedures were being followed and provide feedback to the user and trainers of the firearm with device 1.

Magnetometer for Magnetic Field Sensing Initiated Wake-Up of Device:

FIG. 21A is a right side perspective view of the firearm 600 with clamped LED sight camera attachment 1/500, with a magnetometer sensor in the internal circuit board, and an external magnet 610 magnetically attached to the side of the attachment 1/500.

FIG. 21B is another perspective view of FIG. 21A with the external magnet 610 pulled away from the side of the sight camera attachment.

Referring to FIGS. 21A-21B, we have added a magnetometer sensor to the circuit board shown in FIGS. 9A, 9B, 11A-11B to right-side detect a close range magnetic field.

We have added a magnetometer sensor to the circuit board to detect a close range magnetic field.

Such a magnetometer sensor to be used, can include, but not be limited to the magnetometers shown and described in U.S. Pat. No. 5,376,921 to Trikilis and U.S. Pat. No. 6,784,796 to Johnston et al., and U.S. Published Patent Application: 2003/0169183 to Korepanov et al., which are each incorporated by reference in their entirety.

This feature will allow the device to wake up from low power sleep mode and start running when the device is moved away from a specific preset magnetic range generated by magnetometer on the internal circuit board.

FIG. 22A is another embodiment showing a right side perspective view of the firearm with clamped LED sight camera attachment 600, with a magnetometer sensor in the internal circuit board, and an external magnet attached to a holster 650 which is located adjacent the side of the attachment 1/500.

FIG. 22B is another perspective view of FIG. 22A with the holster 650 having the magnet separated from the firearm and clamped LED sight camera attachment 600.

A magnet located in a holster 650 would activate the sleep mode on the device when the device is put in holster 650. When removed from holster and magnet, it will activate run mode and begin full operation.

Other embodiments can have a magnet could be fitted to a lock box, night stand, or any place that it is stored until needed. Removal from close proximity of magnetic field will activate device to running.

This magnetometer feature will reduce the critical time to wake the device up and begin full operation.

(Currently uses a push button start). The magnetometer can be used as a separate activation switch, or in combination with the push button start switch.

Wireless Charging

FIG. 23A is an upper front right perspective view of the LED sight camera attachment 1/500 for a firearm with a battery charging circuit and separate wireless charging pad, and separate USB cable FIG. 23B is another perspective view of FIG. 23A with the LED sight camera attachment 700 with the wireless charging pad 710 in recharging position adjacent the attachment 700, and the recharging pad 710 ready to be powered by the USB cable 715.

We have added a wireless charging coil and charging circuit to the device 1/500 to allow for wireless charging.

This feature can be used by positioning device on a charging coil to charge the battery.

The type of wireless charging coil and charging circuit with a wireless charging pad and use of a USB cable, can include those shown and described in U.S. Pat. No. 7,897,277 to Meyer et al. and U.S. Published Patent Applications 2015/0062877 to Takes and 2017/0054315 to Chien, which are each incorporated by reference in their entirety.

FIG. 24A is an upper front right perspective view of the LED sight camera attachment 700 of FIG. 23A clamped to a firearm 300.

FIG. 24B is another perspective view of FIG. 24A with the LED sight camera attachment with the wireless charging pad 700 on the firearm in a recharging position inside a holster having a recharging pad 750 ready to be powered by a USB cable 755. The outstanding use of this feature the ability to add a charging coil to a holster 750.

The device 1/500 can be kept fully charged in the holster while being worn.

When the user is not actively mobile, the user can plug in the holster 750 and charging coil 700 will charge the device 700. The holster USB plug will disengage when user is actively moving from charging point.

The device 1/500 is currently being charged with USB port on device.

Rail Key

FIG. 25A is an upper right perspective view of a Multi-position locking rail mount LED sight camera attachment/device/system 800 with separated rail key 850 and attachable side rail 820 with fasteners 825.

FIG. 25B is another perspective view of FIG. 25A with rail key 850 attached to one of the key slots 810.

FIG. 26A is an upper front perspective view of the rail key 850 shown in FIGS. 25A-25B.

FIG. 26B is an upper rear perspective view of the rail key 850 of FIG. 26A. FIG. 26C is a bottom perspective view of the rail key 850 of FIG. 26B FIG. 26D is a bottom perspective view of the rail key 850 of FIG. 26A. FIG. 26E is a top side view of the rail key 850 of FIG. 26A. FIG. 26F is a left end view of the rail key 850 of FIG. 26A.

FIG. 26G is a front end view of the rail key 850 of FIG. 26A. FIG. 26H is a bottom side view of the rail key 850 of FIG. 26A.

FIG. 27A is another upper right perspective view of the LED sight camera attachment 800 of FIG. 25A showing the 12 different positions for the rail key 850 shown in FIGS. 26A-26H.

FIG. 27B is another view of FIG. 27A with the rail key 850 in one slot of LED camera attachment 800.

Referring to FIGS. 25A-27B, the multi-position locking key system 800 allows for a customizable position to fit the varied mounting rails and key locations on the market. It is adjustable by approximately ⅒" for a total of 12 positions. This feature is key to a proper fitment and usability.

Most firearm rail accessories are only made with one rail locking key position on the clamp.

The standard picatinny rail comes with 10 mm spacing.

The multi-position key system allows for 2.5 mm adjustment.

This feature is best realized on rails with only one key slot placement to engage clamp key.

The multi-position key system 800 allows for 12 positions for the rail key 850 to locate the device 1/500 properly.

The term "approximately"/"approximate" can be +/−10% of the amount referenced. Additionally, preferred amounts and ranges can include the amounts and ranges referenced without the prefix of being approximately.

The invention can also be used in low light or NO light conditions, where an auto switch to night vision with non-visible IR LED support, in order to see without being seen in TOTAL darkness.

There can be redundant video recording on either or both the infrared LED sight camera attachment device 1 and/or the portable digital device 400.

The infrared LED sight camera attachment device 1 with app can have an add auto upload for cloud storage.

While the preferred embodiment shows and describes four LEDs, the invention can be used with one to three LEDS and more than four LEDS, arranged in different patterns.

Although the preferred embodiment describes using the infrared sight camera attachment for rails on handguns, the attachment can be used on other weapons, such as but not limited to rifles, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A target sighting system for use with a firearm, comprising in combination:
   a target sighting attachment for the firearm having a camera, a plurality of front facing Light Emitting Diodes (LEDs) adjacent the camera, and an image sender for sending a live target image from the camera to another location,
   an attachment mechanism for attaching the target sighting attachment to the firearm, wherein the attachment mechanism includes:
   a horizontal camera adjustor for adjusting horizontal position of the camera; and
   a vertical camera adjustor for adjusting vertical position of the camera;
   a magnetometer sensor in the attachment to detect a close range magnetic field;
   an external magnet magnetically attached adjacent the target sighting attachment;
   and a portable digital display device adjacent to the firearm with the target sighting attachment for displaying the target image on a display, wherein the firearm with the target sighting attachment is adapted to be held by one hand of a user while the portable digital display device is adapted to be held by another hand of the user, wherein separating the external magnet from being adjacent the target sighting mechanism activates the target sighting attachment from a sleep mode to an active mode where the target image is displayed on the display and recorded.

2. The target sighting system of claim 1, wherein the external magnet is a portable magnet.

3. The target sighting system of claim 1, wherein the external magnet is attached to a holster for the firearm.

4. A target sighting system for use with a handgun, comprising in combination:
   a target sighting attachment for the handgun having a camera, a plurality of front facing Light Emitting Diodes (LEDs) adjacent the camera, and an image sender for sending a live target image from the camera to another location,
   an attachment mechanism for attaching the target sighting attachment to the firearm, wherein the attachment mechanism includes:
   a horizontal camera adjustor for adjusting horizontal position of the camera; and
   a vertical camera adjustor for adjusting vertical position of the camera;
   a magnetometer sensor in the attachment to detect a close range magnetic field;
   an external magnet magnetically attached adjacent the target sighting attachment;
   and a portable digital display device adjacent to the handgun with the target sighting attachment for displaying the target image on a display, wherein the handgun with the target sighting attachment is adapted to be held by one hand of a user while the portable digital display device is adapted to be held by another hand of the user, wherein separating the external magnet from being adjacent the target sighting mechanism activates the target sighting attachment from a sleep mode to an active mode where the target image is displayed on the display and recorded.

5. The target sighting system of claim 4, wherein the external magnet is a portable magnet.

6. The target sighting system of claim 4, wherein the external magnet is attached to a holster for the handgun.

7. A target sighting system for use with a firearm, comprising in combination:
   a target sighting attachment for the firearm having a camera, a plurality of front facing Light Emitting Diodes (LEDs) adjacent the camera, and an image sender for sending a live target image from the camera to another location, the plurality of front facing LEDS includes four LEDS arranged in a rectangular pattern with the camera being in the middle of the four LEDs, the four LEDs are selected from infrared LEDs and visible light LEDs,
   an attachment mechanism for attaching the target sighting attachment to the firearm, wherein the attachment mechanism includes:
   a magnetometer sensor in the attachment to detect a close range magnetic field;

an external magnet magnetically attached adjacent the target sighting attachment;

and a portable digital display device adjacent to the firearm with the target sighting attachment for displaying the target image on a display, wherein the firearm with the target sighting attachment is adapted to be held by one hand of a user while the portable digital display device is adapted to be held by another hand of the user, wherein separating the external magnet from being adjacent the target sighting mechanism activates the target sighting attachment from a sleep mode to an active mode where the target image is displayed on the display and recorded.

8. The target sighting system of claim 7, wherein the external magnet is a portable magnet.

9. The target sighting system of claim 7, wherein the external magnet is attached to a holster for the firearm.

10. A target sighting system for use with a handgun, comprising in combination:

a target sighting attachment for the firearm having a camera, a plurality of front facing Light Emitting Diodes (LEDs) adjacent the camera, and an image sender for sending a live target image from the camera to another location, the plurality of front facing LEDS includes four LEDs arranged in a rectangular pattern with the camera being in the middle of the four LEDs, the four LEDs are selected from infrared LEDs and visible light LEDs, an attachment mechanism for attaching the target sighting attachment to the handgun, wherein the attachment mechanism includes:

a magnetometer sensor in the attachment to detect a close range magnetic field;

an external magnet magnetically attached adjacent the target sighting attachment;

and a portable digital display device adjacent to the handgun with the target sighting attachment for displaying the target image on a display, wherein the handgun with the target sighting attachment is adapted to be held by one hand of a user while the portable digital display device is adapted to be held by another hand of the user, wherein separating the external magnet from being adjacent the target sighting mechanism activates the target sighting attachment from a sleep mode to an active mode where the target image is displayed on the display and recorded.

11. The target sighting system of claim 10, wherein the external magnet is a portable magnet.

12. The target sighting system of claim 10, wherein the external magnet is attached to a holster for the handgun.

\* \* \* \* \*